US009613115B2

(12) United States Patent
Gulwani et al.

(10) Patent No.: US 9,613,115 B2
(45) Date of Patent: Apr. 4, 2017

(54) GENERATING PROGRAMS BASED ON INPUT-OUTPUT EXAMPLES USING CONVERTER MODULES

(75) Inventors: Sumit Gulwani, Redmond, WA (US); David P. Walker, Princeton, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 12/834,031

(22) Filed: Jul. 12, 2010

(65) Prior Publication Data

US 2012/0011152 A1   Jan. 12, 2012

(51) Int. Cl.
G06F 17/30 (2006.01)
G06F 9/45 (2006.01)

(52) U.S. Cl.
CPC .......... *G06F 17/30569* (2013.01); *G06F 8/51* (2013.01)

(58) Field of Classification Search
CPC ...... G06F 17/00; G06F 17/30194; G06F 7/00; G06F 3/01; G06F 5/00; G06F 17/30867; G06F 17/30091; G06F 17/211; G06F 17/30386; G06F 17/30569
USPC ........................................................ 707/602
See application file for complete search history.

(56) References Cited

U.S. PATENT DOCUMENTS

| 5,790,760 | A | 8/1998 | Arima |
| 5,920,717 | A | 7/1999 | Noda |
| 6,035,302 | A | 3/2000 | Tonouchi |
| 6,327,699 | B1 | 12/2001 | Larus et al. |
| 6,484,310 | B1 | 11/2002 | Przybylski et al. |
| 6,882,999 | B2 | 4/2005 | Cohen et al. |
| 6,963,871 | B1 | 11/2005 | Hermansen et al. |
| 7,010,779 | B2 | 3/2006 | Rubin et al. |

(Continued)

FOREIGN PATENT DOCUMENTS

| CN | 1400547 | 3/2003 |
| CN | 101639861 | 2/2010 |
| WO | WO-2010088523 | 8/2010 |

OTHER PUBLICATIONS

Simitsis, Alkis, Panos Vassiliadis, and Timos Sellis. "Optimizing ETL processes in data warehouses." 21st International Conference on Data Engineering (ICDE'05). IEEE, 2005.*

(Continued)

*Primary Examiner* — Nan Hutton

(57) ABSTRACT

A program generation system is described that generates a program based on a plurality of input-output examples. The input-output examples include input items and corresponding output items. The program generation system can include three component modules. A parsing module processes the input items and output items to provide a plurality of input parts and output parts, respectively. A transformation module determines, for each output part, whether the output part can be produced from a corresponding input part using one or more converter modules selected from a collection of candidate converter modules. A formatting module generates formatting instructions that transform selected output parts into a form specified by the output items. These three modules provide a generated program that embodies logic learned from the input-output examples; the generated program can be subsequently used to transform new input items into new respective output items.

20 Claims, 13 Drawing Sheets

(56) References Cited

U.S. PATENT DOCUMENTS

| | | |
|---|---|---|
| 7,155,683 B1 | 12/2006 | Williams |
| 7,165,019 B1 | 1/2007 | Lee et al. |
| 7,433,885 B2 | 10/2008 | Jones |
| 7,676,444 B1 | 3/2010 | Venkatachary et al. |
| 7,979,268 B2 | 7/2011 | Lee |
| 8,175,875 B1 | 5/2012 | Dean et al. |
| 8,799,234 B2 | 8/2014 | Gulwani et al. |
| 8,972,930 B2 | 3/2015 | Gulwani |
| 9,552,335 B2 | 1/2017 | Gulwani et al. |
| 2002/0069220 A1 | 6/2002 | Tran |
| 2003/0004874 A1* | 1/2003 | Ludwig et al. ............ 705/40 |
| 2004/0158810 A1 | 8/2004 | Dove et al. |
| 2005/0080755 A1* | 4/2005 | Aoyama ................. 707/1 |
| 2005/0149536 A1* | 7/2005 | Wildes et al. ............ 707/100 |
| 2005/0182629 A1 | 8/2005 | Coorman et al. |
| 2005/0228640 A1 | 10/2005 | Aue et al. |
| 2005/0246681 A1 | 11/2005 | Little et al. |
| 2007/0055493 A1 | 3/2007 | Lee |
| 2008/0282108 A1 | 11/2008 | Jojic et al. |
| 2009/0049354 A1 | 2/2009 | Buckley, Jr. et al. |
| 2009/0077542 A1* | 3/2009 | Chou et al. ............ 717/132 |
| 2009/0106710 A1 | 4/2009 | Teig et al. |
| 2009/0119416 A1* | 5/2009 | Sirdevan et al. ......... 709/246 |
| 2009/0119584 A1 | 5/2009 | Herbst |
| 2009/0132477 A1* | 5/2009 | Zuev et al. ............ 707/3 |
| 2009/0210418 A1 | 8/2009 | Arasu et al. |
| 2009/0226081 A1* | 9/2009 | Zhou et al. ............ 382/159 |
| 2009/0288065 A1 | 11/2009 | Nathan et al. |
| 2009/0300326 A1 | 12/2009 | Sweeney |
| 2010/0083092 A1 | 4/2010 | Schuller et al. |
| 2010/0125828 A1 | 5/2010 | Vasista |
| 2010/0146254 A1 | 6/2010 | Park et al. |
| 2010/0312549 A1 | 12/2010 | Akuwudike |
| 2011/0038531 A1 | 2/2011 | Arasu et al. |
| 2011/0302553 A1 | 12/2011 | Gulwani |
| 2012/0011084 A1 | 1/2012 | Gulwani et al. |
| 2013/0326475 A1 | 12/2013 | Gulwani |

OTHER PUBLICATIONS

Romero, Cristóbal, Sebastián Ventura, and Enrique Garcia. Data mining in course management systems: Moodle case study and tutorial. Computers & Education 51.1 (2008): 368-384.*

Di Lorenzo, Giusy, et al. "Data integration in mashups." ACM Sigmod Record 38.1 (2009): 59-66.*

Search Report and Written Opinion for PCT Application No. PCT/US2011/037411 (corresponding to U.S. Appl. No. 12/793,700), mailed on Feb. 9, 2012, 8 pages.

Chattratichat, et al., "A Visual Language for Internet-Based Data Mining and Data Visualization," retrieved at <<http://ieeexplore.ieee.org/stamp/stamp.jsp?tp=&arnumber=795876 >>, Proceedings of the IEEE Symposium on Visual Languages, Sep. 1999, 8 pages.

"Planning, Installation, and Problem Determination Guide," retrieved at <<http://callpath.genesyslab.com/docs63/html/cpepipd/epipd142.htm>>, Retrieved on Feb. 24, 2010, Genesys Telecommunications Laboratories, Inc., Daly City, CA, 14 pages.

Matskin, et al., "Value-Added Web Services Composition Using Automatic Program Synthesis," retrieved at <<http://www.cs.cmu.edu/~jinghai/papers/wes02_lncs.pdf>>, Lecture Notes in Computer Science, vol. 2512, Revised Papers from the International Workshop on Web Services, E-Business, and the Semantic Web, May 2002, pp. 213-224.

Schrödl, et al., "Inferring Flow of Control in Program Synthesis by Example," retrieved at <<http://www.tzi.de/~edelkamp/publications/conf/ki/SchroedIE99.pdf>>, Lecture Notes in Computer Science, vol. 1701, Proceedings of the 23rd Annual German Conference on Artificial Intelligence: Advances in Artificial Intelligence, Sep. 1999, 12 pages.

Gualtieri, Mike, "Deputize End-user Developers to Deliver Business Agility and Reduce Costs," retrieved at <<http://www.forrester.com/rb/Research/deputize_end-user_developers_to_deliver_business_agility/q/id/54191/t/2>>, Forrester Research, abstract provided only, Apr. 15, 2009, 2 pages.

Ko, et al., Six Learning Barriers in End-User Programming Systems, version retrieved at <<http://faculty.washington.edu/ajko/papers/Ko2004LearningBarriers.pdf>>, Proceedings of the 2004 IEEE Symposium on Visual Languages, Human Centric Computing, 2004, 8 pages.

McFedries, Paul, Tricks of the Microsoft Office Gurus (Business Solutions), Que Corp., 2nd Edition, 2007, Amazon.com product page only, retrieved at <<http://amazon.com>>, retrieved on Jul. 5, 2010, 1 page.

Myers, et al., "Invited Research Overview: End-User Programming," retrieved on <<http://acm.org>>, Conference on Human Factors in Computing Systems, CHI '06 Extended Abstracts on Human Factors in Computing Systems, 2006, pp. 75-80.

Sumit Gulwani homepage and publication listing, retrieved at <<http://research.microsoft.com/en-us/um/people/sumitg>>, Microsoft Corporation, Redmond, WA, 4 pages.

Fisher, et al., "From Dirt to Shovels: Fully Automatic Tool Generation from Ad Hoc Data," retrieved at <<http://acm.org>>, Proceedings of the 35th Annual ACM SIGPLAN-SIGACT Symposium on Principles of Programming Languages, 2008, pp. 421-434.

Fisher, et al., "LearnPADS: Automatic Tool Generation from Ad Hoc Data," retrieved at <<http://acm.org>>, Proceedings of the ACM SIGMOD International Conference on Management of Data, 2008, pp. 1299-1302.

Xi, et al., "Ad Hoc Data and the Token Ambiguity Problem," retrieved at <<http://www.cs.princeton.edu/~dpw/papers/padl08.pdf>>, Proceedings of the 11th International Symposium on Practical Aspects of Declarative Languages, 2009, 15 pages.

De Moura, et al., "Z3: An Efficient SMT Solver," retrieved at <<http://acm.org>>, Tools and Algorithms for the Construction and Analysis of Systems, vol. 4963/2008, Apr. 3, 2008, pp. 337-340.

PADs project, online documentation page, retrieved at <<http://www.padsproj.org/doc.html>>, retrieved on Jul. 5, 2010, 4 pages.

"Program Synthesis", *Microsoft Research, Microsoft Corporation*, Redmond, WA, retrieved from <<http://research.microsoft.com/en-us/um/people/sumitg/pubs/synthesis.html> on Jul. 1, 2012, 4 pages.

Angluin, Dana "Learning Regular Sets from Queries and Counterexamples", *Journal of Information and Computation*, vol. 75, Issue 2, retrieved from <http://www.cse.iitk.ac.in/users/chitti/thesis/references/learningRegSetsFromQueriesAndCounterExamples.pdf>, (1987), pp. 87-106.

Arasu, Arvind et al., "Learning String Transformations from Examples", *Proceedings of the VLDB Endowment*, vol., Issue 1, retrieved from <http://acm.org>, (Aug. 2009), pp. 514-525.

Chaudhuri, Swarat et al., "Smooth Interpretation", *Proceedings of the 2010 ACM SIGPLAN conference on Programming language design and implementation*, vol. 45, Issue 06, Jun. 5-10, 2010, retrieved from <http://people.csail.mit.edu/asolar/papers/pldi276-chaudhuri.pdf>, (Jun. 5, 2010), 13 pages.

Cypher, Allen "EAGER: Programming Repetitive Tasks by Example", *Proceedings of the SIGCHI conference on Human factors in computing systems*, Apr. 28-May 2, 1991, retrieved from <http://citeseerx.ist.psu.edu/viewdoc/download;jsessionid=5F31COF2A851 FAE41 EF9FOE1 84F75089?doi=1 0.1.1.35.2047&rep=rep1 &type=pdf>, (Apr. 28, 1991), 9 pages.

Elhadi, Mohamed et al., "Use of Text Syntactical Structures in Detection of Document Duplicates", *Third International Conference on Digital Information Management*, Nov. 13-16, 2008, retrieved from <http://ieeexplore.ieee.org/stamp/stamp.jsp?tp=&arnumber=4746719>, (Nov. 13, 2008), pp. 520-525.

Fisher, Kathleen et al., "PADS: A Domain-Specific Language for Processing Ad Hoc Data", *Proceedings of the 2005 ACM SIGPLAN conference on Programming language design and implementation*, vol. 40, Issue 06, Jun. 2005, retrieved from <http://www.padsproj.org/papers/pldi.pdf>, (Jun. 2005), 10 pages.

Fisher, Kathleen et al., "The Next 700 Data Description Languages", *Conference record of the 33rd ACM SIGPLAN-SIGACT symposium on Principles of programming languages*, vol. 41, Issue

(56) References Cited

OTHER PUBLICATIONS

01, Jan. 11-13, 2006, retrieved from <http://citeseerx.ist.psu.edu/viewdoc/download?doi=1 0.1.1.139.4909&rep=rep1&type=pdf>, (Jan. 11, 2006), 14 pages.

Gong, Hongqi et al., "Automating Miscrosoft Office Word in Visual Basic", *econd International Symposium on Electronic Commerce and Security*, 2009, retrieved from <http://ieeexplore.ieee.org/stamp/stamp.jsp?tp=&arnumber=5209821>, (2009), pp. 93-97.

Gulwani, et al., "Expedited Techniques for Generating String Manipulation Programs", U.S. Appl. No. 13/487,266, filed Jun. 4, 2012, 74 pages.

Gulwani, et al., "Inductive Synthesis of Table-Based String Transformations", U.S. Appl. No. 13/310,238, filed Dec. 2, 2011, 41 pages.

Gulwani, Sumit "Automating String Processing in Spreadsheets Using Input-Output Examples", *Proceedings of the 38th annual ACM SIGPLAN-SIGACT symposium on Principles of programming languages*, vol. 46, Issue 01, Jan. 26-28, 2011, retrieved from <http://research.microsoft.com/en-us/um/people/sumitg/pubs/popl11-synthesis.pdf>, (Jan. 26, 2011), 13 pages.

Gulwani, Sumit "Dimensions in Program Synthesis", *Proceedings of the 12th international ACM SIGPLAN symposium on Principles and practice of declarative programming*, 2010, retrieved from <http://research.microsoft.com/en-us/um/people/sumitg/pubs/ppdp10-synthesis.pdf>, (2010), 12 pages.

Gulwani, Sumit et al., "A Polynomial-Time Algorithm for Global Value Numbering", *Proceedings of Static Analysis Symposium*, retrieved from <http://www.cs.berkeley.edu/~necula/Papers/gvndet_sas04.pdf>, (2004), pp. 212-228.

Gulwani, Sumit et al., "Spreadsheet Data Manipulation Using Examples", *Microsoft Corporation*, Redmond, WA, Feb. 2012 (note: 2008 copyright date on p. 1 is incorrect and is therefore crossed out), retrieved from <http://research.microsoft.com/enus/um/people/sumitg/pubs/cacm12-synthesis.pdf> on Jul. 1, 2012, (Feb. 2012), 9 pages.

Harris, William R., et al., "Spreadsheet Table Transformations from Examples", *Proceedings of the 32nd ACM SIGPLAN Conference on Programming Language Design and Implementation*, retrieved from <http://research.microsoft.com/enus/um/people/sumitg/pubs/pldi11-table-synthesis-tr.pdf>, (Jun. 4, 2011), 17 pages.

Jha, Susmit et al., "Oracle-Guided Component-Based Program Synthesis", *Proceedings of the 32nd ACM/IEEE International Conference on Software Engineering*, vol. 1, retrieved from <http://acm.org>, (May 2010), pp. 215-224.

Kuncak, Viktor et al., "Complete Functional Synthesis", *Proceedings of the 2010 ACM SIGPLAN conference on Programming language design and implementation*, vol. 46, Issue 06, Jun. 5-10, 2010, retrieved from <http://icwww.epfl.ch/-piskac/publications/KuncakETAL10CompleteFunctionaiSynthesis.pdf>, (Jun. 5, 2010), 14 pages.

Lau, Tessa "Why PBD Systems Fail: Lessons Learned for Usable AI", *CHI 2008 Workshop on Usable AI*, 2008, retrieved from <http://citeseerx.ist.psu.edu/viewdoc/download;jsessionid=FEE7F6F1207FOC9BA601E6781 E 1 EC7E3?doi=10.1.1.145.208&rep=rep1 &type= pdf>, (2008), 4 pages.

Lau, Tessa et al., "Learning Programs from Traces Using Version Space Algebra", *Proceedings of the 2nd International Conference on Knowledge Capture*, retrieved from <http://www.cs.washington.edu/homes/pedrod/papers/kcap03b.pdf>, (Oct. 23, 2003), 8 pages.

Lau, Tessa et al., "Learning Repetitive Text-editing Procedures with SMARTedit", *Lieberman, ed., Your Wish is My Command: Giving Users the Power to Instruct their Software*, Morgan Kaufmann, Mar. 21, 2011, retrieved from <http://www.cs.washington.edu/homes/pedrod/papers/ywimc.html> Mar. 21, 2011, 14 pages.

Lau, Tessa et al., "Programming by Demonstration Using Version Space Algebra", *Programming by demonstration using version space algebra. Machine Learning*, vol. 53, Issue 01-02, Oct.-Nov. 2003, retrieved from <http://www.cs.indiana.edu-scodial/b552/fulltext.pdf>, (Oct. 2003), 46 pages.

Lau, Tessa et al., "Programming Shell Scripts by Demonstration", *Workshop on Supervisory Control of Learning and Adaptive Systems, American Association for Artificial Intelligence*, retrieved from <<http://citeseerx.ist.psu.edu/viewdoc/download?doi=10.1.1.74.6224&rep=rep1&type=pdf>, (Apr. 2004), 5 pages.

Lau, Tessa et al., "Version Space Algebra and Its Application to Programming by Demonstration", *Proceedings of the Seventeenth International Conference on Machine Learning*, retrieved from <http://www.cs.washington.edu/homes/pedrod/papers/mlc00c.pdf>, (2000), 8 pages.

Miller, Robert C., et al., "Interactive Simultaneous Editing of Multiple Text Regions", *Proceedings of the General Track: 2002 USE NIX Annual Technical Conference*, Jun. 2001, retrieved from <http://groups.csail.mit.edu/uid/projects/simuledit/usenix01.pdf>, (Jun. 2001), 15 pages.

Mitchell, Tom M., "Generalization as Search", *Proceedings of Artificial Intelligence*, vol. 18, Issue 2, retrieved from <http://citeseerx.ist.psu.edu/viewdoc/download?doi=10.1.1.121.5764&rep=rep1&type=pdf>, (1982), pp. 203-226.

Nix, Robert P., "Editing by Example", *Proceedings of the 11th ACM SIGACT-SIGPLAN symposium on Principles of programming languages*, vol. 07, Issue 04, Oct. 1985, (Oct. 1985), pp. 600-621.

Russell, Stuart "Artifical Intelligence: A Modern Approach", *3rd Edition, Prentice Hall*, Amazon.com, product page only, retrieved from <http://www.amazon.com> on Jul. 1, 2012, (Dec. 11, 2009), 6 pages.

Singh, Rishabh et al., "Learning Semantic String Transformations from Examples", *Proceedings of the VLDB Endowment*, vol. 5, Issue 8, retrieved from <http://research.microsoft.com/en-us/um/people/sumitg/pubs/semantic.pdf>, (Apr. 2012), 16 pages.

Singh, Rishabh et al., "Learning Semantic String Transformations from Examples", *Proceedings of the VLDB Endowment*, vol. 5, Issue 8, Apr. 2012, retrieved from <http://acm.org>, (Apr. 2012), pp. 740-751.

Singh, Rishabh et al., "Synthesizing Number Transformations from Input-Output Examples", *Microsoft Research, Microsoft Corporation*, Redmond, WA, retrieved from <http://research.microsoft.com/en-us/um/people/sumitg/pubs/cav12-tr.pdf> Jul. 1, 2012, on 72 pages.

Solar-Lezama, Armando et al., "Sketching Stencils", *Proceedings of the 2007 ACM SIGPLAN conference on Programming languge design and implementation*, vol. 42, Issue 06, Jun. 11-13, 207, retrieved from <http://www.cs.berkeley.edu/-bodik/research/pldi07-sketching-stencils.pdf>, (Jun. 11, 2007), 12 pages.

Srivastava, Saurabh et al., "From Program Verification to Program Synthesis", *Proceedings of the 37th ACM SIGACT-SIGPLAN Symposium on Principles of Programming Languages*, Jan. 17-23, 2010, retrieved from <http://research.microsoft.com/en-us/um/people/sumitg/pubs/popl1 O_synthesis.pdf>, (Jan. 17, 2010), 14 pages.

Tejada, Sheila et al., "Learning Domain-Independent String Transformation Weights for High Accuracy Object Identification", *Eighth ACM SIGKDD International Conference on Knowledge Discovery and Data Mining*, retrieved from <http://www.isi.edu/info-agents/papers/tejada02-kdd.pdf>, (Jul. 23, 2002), 10 pages.

Vilar, Juan M., "Query Learning of Subsequential Transducers", *Proceedings of the 3rd International Colloquium on Grammatical Inference: Learning Syntax from Sentences, Lecture Notes in Computer Science*, vol. 1147, retrieved from <http://www.springerlink.com>, (1996), pp. 72-83.

Walkenbach, John "Excel 2010 Formulas", *Wiley Publishing, Inc.*, Amazon.com product page only, retrieved from <http://www.amazon.com> on Jul. 1, 2012,(May 24, 2010), 6 pages.

Witten, Ian H., et al., "TELS: Learning Text Editing Tasks from Examples", *MIT Press*, Cambridge, MA, 1993, retrieved from <http://acypher.com/wwid/Chapters/08TELS.html> on Jun. 13, 2012, 17 pages.

Xi, Qian et al., "A Context-free Markup Language for Semi-structured Text", *Proceedings of the 2010 ACM SIGPLAN conference on Programming language design and implementation*, vol. 45, Issue 06, Jun. 5-10, 2010, retrieved from <https://www.cs.princeton.edu/~dpw/papers/anne-pldi10.pdf>, (Jun. 5, 2010), 12 pages.

(56) References Cited

OTHER PUBLICATIONS

Zhang, Ying et al., "Editable Replay of IDE-based Repetitive Tasks", *32nd Annual IEEE International Computer Software and Applications Conference*, Jul. 28- Aug. 1, 2008, pp. 473-480, retrieved from <http://sei.pku.edu.cn/-zhangying06/publications/Compsac08-SmartReplayer.pdf>, (Jul. 28, 2008), pp. 473-480.
"Non-Final Office Action", U.S. Appl. No. 12/793,700, (Mar. 14, 2013), 22 pages.
"Final Office Action", U.S. Appl. No. 12/793,700, (Aug. 22, 2013), 23 pages.
"Foreign Office Action", CN Application No. 201180027421.8, Jan. 27, 2015, 13 Pages.
"Foreign Office Action", EP Application No. 11790189.2, Feb. 9, 2015, 3 Pages.
"Foreign Office Action", EP Application No. 11790189.2, Dec. 3, 2014, 3 Pages.
"European Search Report", EP Application No. 11790189.2, Oct. 21, 2013, 2 pages.
"Foreign Office Action", EP Application No. 11790189.2, Nov. 4, 2013, 6 pages.
"Non-Final Office Action", U.S. Appl. No. 12/793,700, Jan. 6, 2014, 23 pages.
"Non-Final Office Action", U.S. Appl. No. 13/020,153, Nov. 14, 2013, 10 pages.
"Notice of Allowance", U.S. Appl. No. 13/020,153, Mar. 20, 2014, 5 pages.
Alvarez, et al., "FINDER: A Mediator System for Structured and Semi-Structured Data Integration", In Proceedings of DEXA, Sep. 2002, 5 pages.
Embley, "Table-Processing Paradigms: A Research Survey", International Journal of Document Analysis and Recognition, vol. 8, No. 2-3, May 9, 2006, pp. 66-86.
Gulwani, "Generating Text Manipulation Programs Using Input-Output Examples", U.S. Appl. No. 12/793,700, Jun. 4, 2010, 52 Pages.
"Notice of Allowance", U.S. Appl. No. 12/793,700, Jul. 11, 2014, 12 pages.
"Foreign Office Action", CN Application No. 201210023688.6, Jan. 30, 2014, 13 pages.
"Foreign Office Action", CN Application No. 20120023688.6, Sep. 12, 2014, 7 pages.
Richardson, et al., "Approaches to Specification-Based Testing", TAV3 Proceedings of the ACM SIGSOFT '89 third symposium on Software testing, analysis, and verification, Dec. 1989, pp. 86-96.
Sarma, et al., "Synthesizing View Definitions from Data", Proceedings of the 13th International Conference on Database Theory, Mar. 2010, pp. 89-103.
"Foreign Notice of Allowance", CN Application No. 201180027421.8, Sep. 21, 2015, 4 Pages.
"Foreign Office Action", EP Application No. 11790189.2, May 29, 2015, 3 Pages.
"Non-Final Office Action", U.S. Appl. No. 13/487,266, Aug. 27, 2015, 29 pages.
"Final Office Action", U.S. Appl. No. 13/487,266, Jun. 3, 2016, 14 pages.
"Notice of Allowance", U.S. Appl. No. 13/487,266, Sep. 14, 2016, 12 pages.
"Supplemental Notice of Allowance", U.S. Appl. No. 13/487,266, Dec. 29, 2016, 2 pages.

* cited by examiner

GENERATING PROGRAMS BASED ON INPUT-OUTPUT EXAMPLES USING CONVERTER MODULES

BACKGROUND

Many data manipulation scenarios involve converting a large quantity of input information from one format to another format. For example, assume that a user wishes to convert a collection of invoice records from an original format to a target format. For example, the user may wish to convert the invoice records into a native format that is used by his or her record-keeping software. If the collection of invoice records is small enough, the user may decide to perform this conversion in a manual manner. However, this task becomes increasingly impracticable as the size of the collection grows larger.

A user may alternatively address this task by writing a program which converts the records from an input format to a desired output format. For example, a user who is an expert in spreadsheet-related technology can write a macro program which performs this task. However, many users do not have the requisite skills and/or motivation to write such programs. Further, writing a satisfactory program can be a non-trivial and time-consuming task for even experienced users.

The above features and attendant potential shortcomings are presented by way of illustration. Existing data manipulation strategies may suffer from yet other shortcomings and challenges.

SUMMARY

A program generation system is described that generates a program based on plural input-output examples. The input-output examples include input items and corresponding output items. In one implementation, the program generation system includes three component modules. A parsing module processes the input items and output items to provide a plurality of input parts and output parts, respectively. A transformation module determines, for each output part, whether the output part can be produced from a corresponding input part using one or more converter modules selected from a collection of candidate converter modules. A formatting module generates formatting instructions that transform selected output parts into a form specified by the original output items. These three modules yield a generated program that embodies logic learned from the input-output examples; the generated program can be subsequently used to transform new input items into new respective output items.

According to one illustrative aspect, the parsing module determines the input parts and the output parts based on one or more parsing tools. In one case, a parsing tool makes reference to a data store of parsing rules.

According to one illustrative aspect, the transformation module selects one or more converter modules for an output part by successively investigating each candidate converter module in the collection of candidate converter modules. In another case, the determination module can use a search acceleration tool to more efficiently search through the collection of candidate converter modules.

According to one illustrative aspect, each candidate converter module is configured to transform input information into output information based on at least one predetermined conversion rule. For example, one type of converter module can convert date information from a first date format to a second date format. Another type of converter module can convert measurement information from a first standard to a second standard. Another type of converter module can process numeric information using a mathematical operation. Another type of converter module can search for identified content in an input item and replace it with designated content for use in a corresponding output item, and so on.

According to one illustrative aspect, the formatting module generates formatting instructions which arrange output parts in an order which matches a format specified by the original output items. The formatting module can also generate formatting instructions which print constant information to match invariant information presented in the output items.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a program generation system for generating a program for use in performing a data manipulation task. Sections B, C, and D respectively describe a parsing module, a transformation module, and a formatting module used by the program generation system. And Section E describes illustrative processing functionality that can be used to implement any aspect of the features of the foregoing sections.

Figure 14:
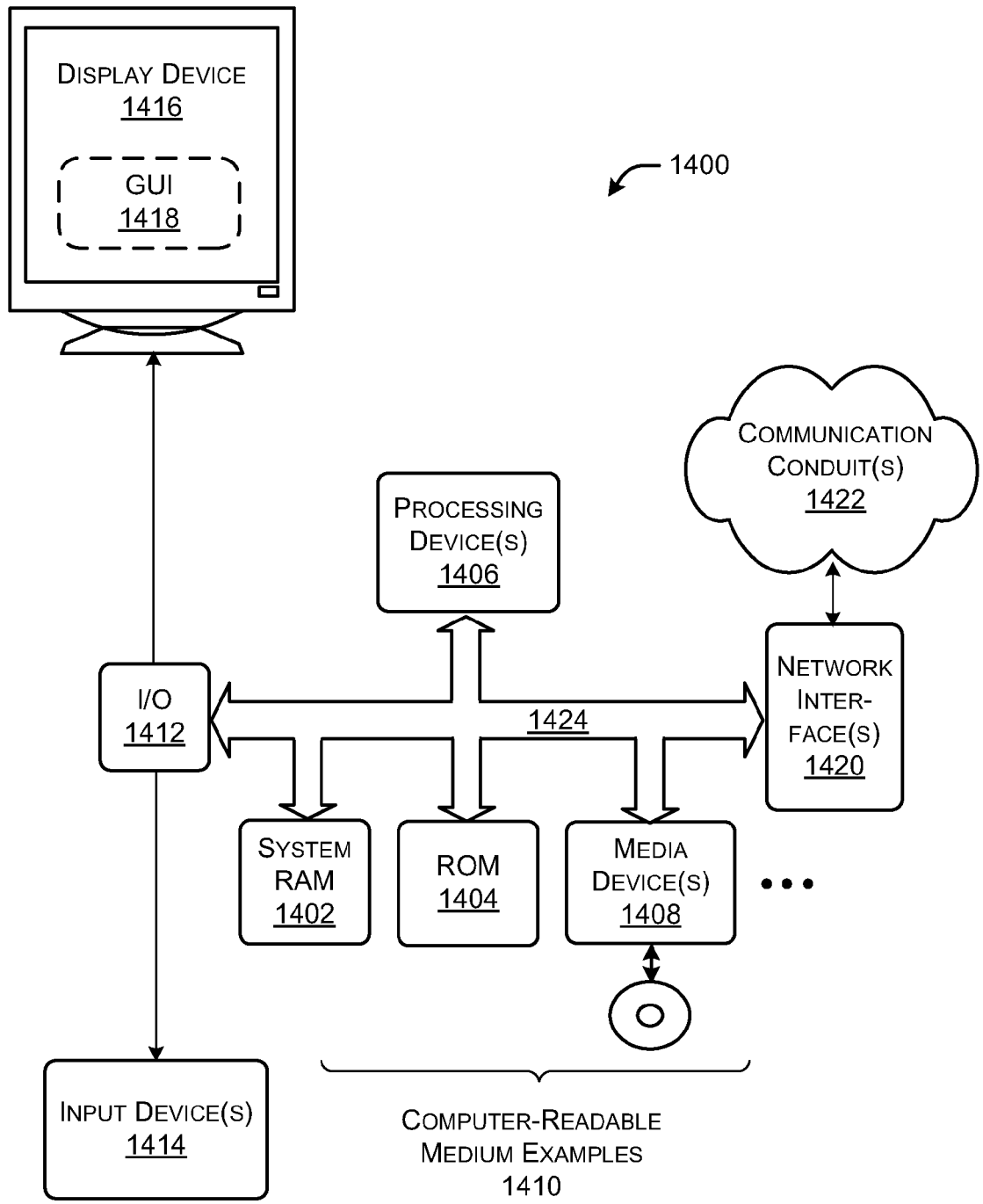
FIG. 14 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 14, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system (e.g., "computing functionality"), a logic component represents a physical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Overview and Illustrative Usage Scenarios

Figure 1:
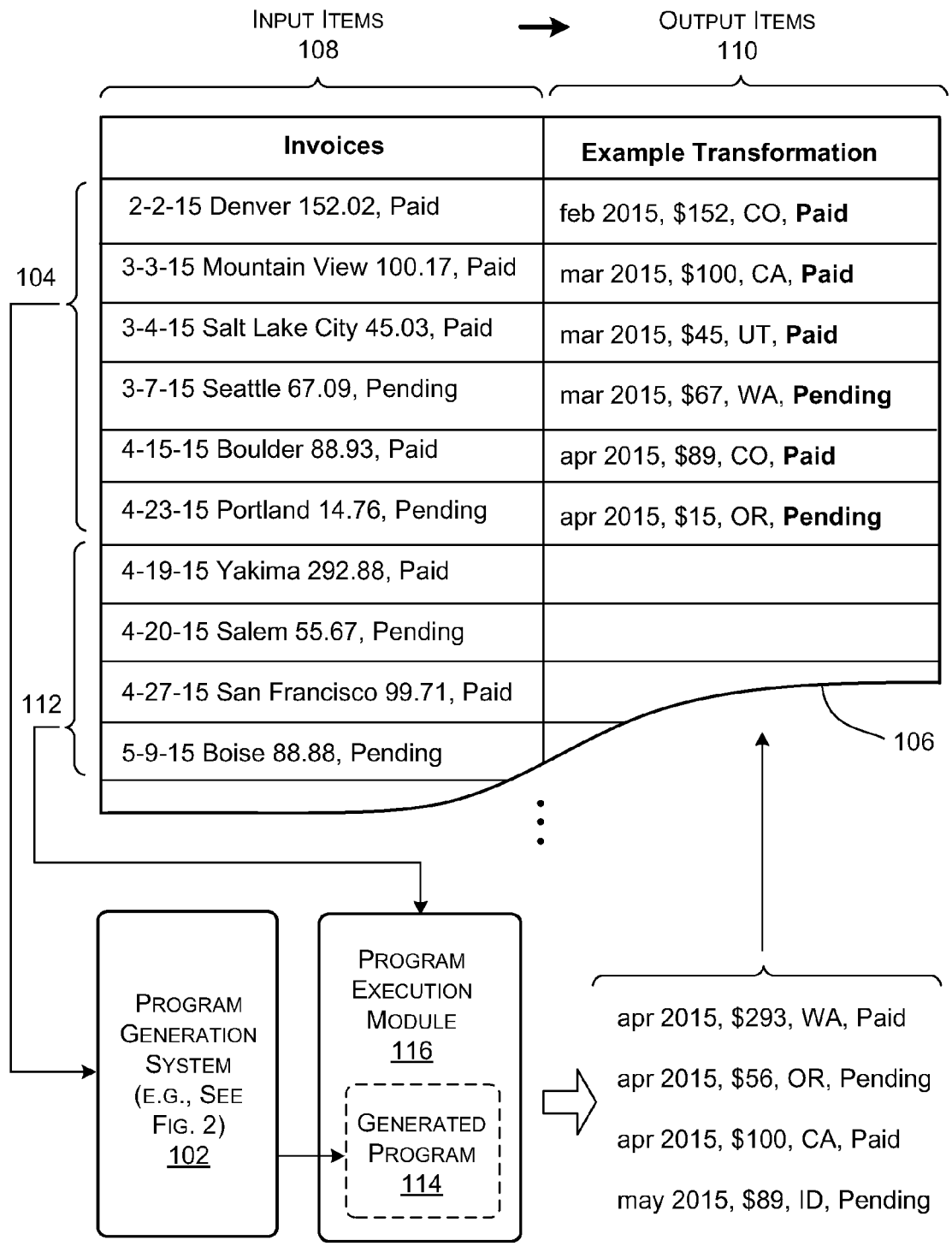
FIG. 1 shows a program generation system for generating a program that performs a data manipulation task based on input-output examples, together with a program execution module which applies the program to new input items.

FIG. 1 shows an illustrative program generation system 102 for creating a program based on input-output examples. Each input-output example includes an input item and a corresponding output item. The input item may include one or more component parts, referred to herein as input parts. The output item may also include one or more component parts, referred to as output parts.

Each output item represents some type of transformation performed on a corresponding input item. For example, an output item may include one or more output parts which represent direct copies of one or more corresponding input parts taken from the input item. In addition, or alternatively, an output item may include one or more output parts which represent transformations (not direct copies) of one or more corresponding input parts. In addition, or alternatively, an output item can include formatting applied to its content that differs from the formatting applied to the corresponding input item. In addition, or alternatively, an output item can include one or more output parts which have no counterpart parts within the corresponding input item. In addition, or alternatively, an output item need not include a counterpart part for every input part in the corresponding input item.

For example, FIG. 1 presents an illustrative set of input-output examples 104 within a data file 106. The set of input-output examples 104 includes a plurality of input items 108 and a corresponding plurality of output items 110. In this example, the input items comprise a single column of alphanumeric input information; likewise, the output items 110 comprise a single column of alphanumeric output information. However, in other cases, a data file 106 can include a single column of input information which maps to two or more columns of output information. In another case, the data file 106 can include two more columns of input information which maps to a single column of output information. In another case, the data file 106 can include two or more columns of input information which maps to two or more columns of output information, and so on. Further, a data file 106 can organize sets of input information and output information in any manner (that is, besides, or in addition to, a columnar organization). More generally stated, the example shown in FIG. 1 can be varied in many different ways.

In the particular scenario of FIG. 1, the input items represent invoices in an original format. The output items represent a transformed version of the invoices in an output format. For example, the first input item includes a date in a particular format ("2-2-15"), representing a date of Feb. 2, 2015. The output item transforms this date to another format, that is, by printing an abbreviation of the month name (i.e., "Feb."). In addition, the output item transforms the first character of the month abbreviation from uppercase to lowercase, to thereby yield "feb." The first input item also includes a name of a city, namely "Denver." The output item transforms this city information into corresponding abbreviated state information, namely "CO." The first input item also includes a cost value in dollars, namely "152.02." The output item repeats this cost value, but rounds the value off to the nearest dollar amount, yielding "152." The first input item also includes a string "Paid." The output item repeats this string in verbatim fashion.

Further note that the output item (for the first input-output example) includes additional information that is not present in the corresponding input item. For example, the output item includes three commas, whereas the input item only includes a single comma. Further, the output item adds a dollar sign "$" in front of the cost figure "152." Further, the output item arranges information in a different manner compared to the corresponding input item. For example, the input item places the location information ("Denver") prior to the cost information ("152.02"), whereas the output item places the cost information ("152") before the location information ("CO"). Finally, the output item renders the last string ("Paid") in boldface, whereas it is not presented in boldface in the input item. As can be appreciated, this particular example is presented merely for explanation purposes. Other input-output examples can vary from this scenario in any manner.

The data file 106 also includes another set of untransformed input items 112 that do not yet have corresponding output items. For small data sets, the user may study the set of input-output examples 104 to discover the logic that is being used to transform input items to corresponding output items. The user may then manually generate new output items for the set of new input items 112 which conform to this logic. However, this manual operation becomes impractical as the size of the data file 106 increases.

To address this issue, the program generation system 102 automatically generates a program 114 that assists the user in transforming the set of input items 112 into a desired output form. From a high level perspective, the program generation system 102 generates the program 114 based on the set of input-output examples 104. A program execution module 116 then applies the program 114 to the set of new input items 112. This yields a set of new output items. For example, the program 114 automatically transforms the new input item "4-19-15 Yakima 292.88, Paid" to "apr 2015, $293, WA, Paid."

Figure 2:
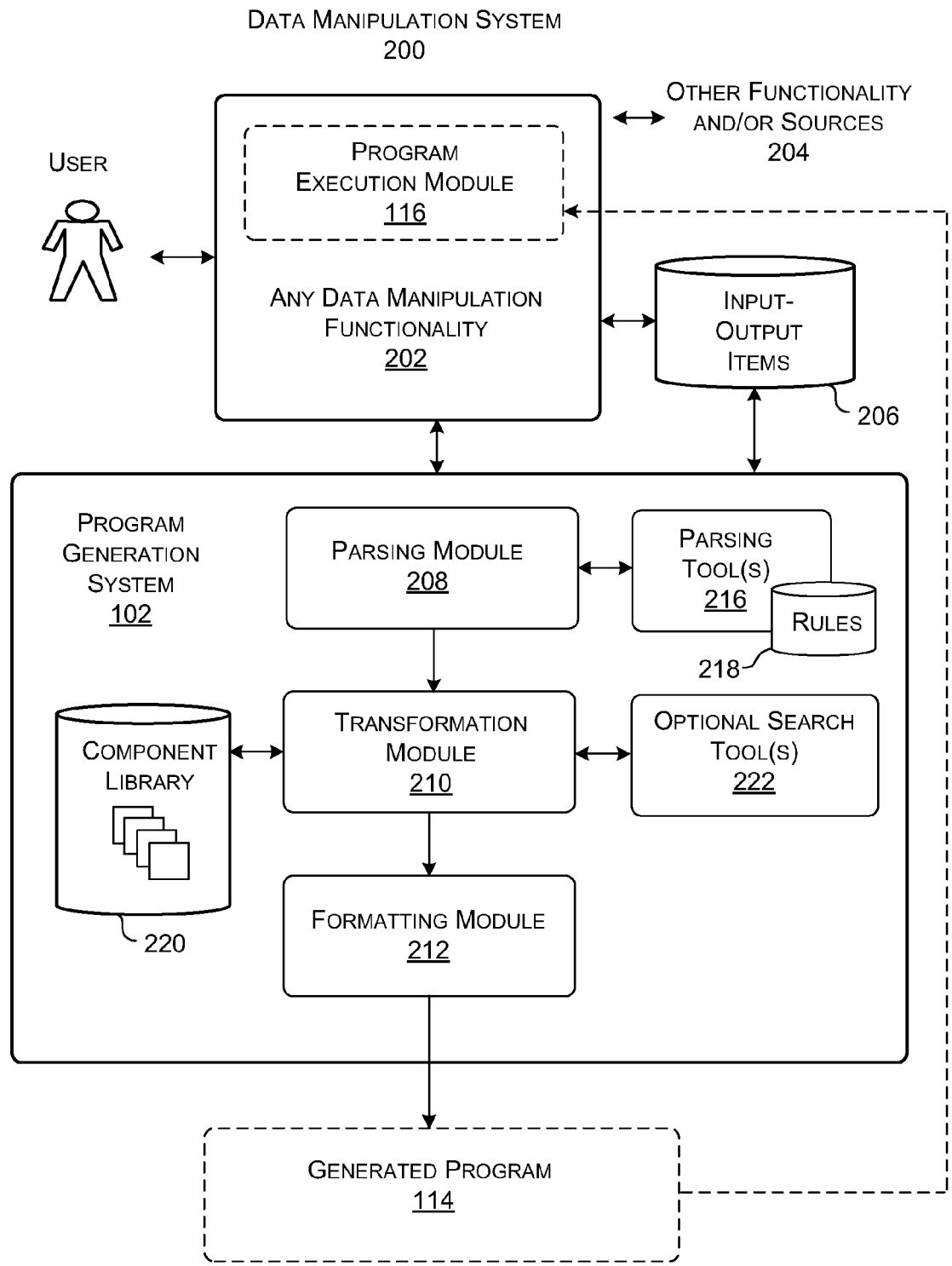
FIG. 2 shows a data manipulation system that includes the program generation system and program execution module of FIG. 1.

FIG. 2 shows one illustrative data manipulation system 200 that can make use of the program generation system 102 and the program execution module 116 of FIG. 1. Generally, FIG. 2 demarcates different modules to clearly identify the functions performed by these respective modules. In one case, these modules may represent different physical components. In other cases, one or more of the modules may represent components within one or more other modules.

From a high-level perspective, the program generation system 102 operates in conjunction with any type of data manipulation functionality 202. The data manipulation functionality 202 represents any tool for performing processing on data items. In one case, the data manipulation functionality 202 may provide a user interface which allows a user to inspect and modify the data items. For example, in one case, the data manipulation functionality 202 may represent a spreadsheet system that allows a user to manipulate data items in tabular form. One spreadsheet system that can be used is Microsoft Office Excel® provided by Microsoft® Corporation of Redmond, Wash. In another case, the data manipulation functionality 202 may represent table manipulation functionality within a document editing application, and so on.

The data manipulation functionality 202 may interact with other functionality 204. For example, the data manipulation functionality 202 may receive data items from the other functionality 204, or send data items to the other functionality 204. The other functionality 204 may represent an application module of any type (such as a document editing application, a spreadsheet application, and so on). Alternatively, or in addition, the other functionality 204 may represent a network-accessible entity of any type. For example, the other functionality 204 may represent a collection of data items maintained in a remote data store, accessible via the Internet.

In operation, the user may feed a collection of input-output examples to the data manipulation functionality 202. For example, in one case, the user may manually create a set of input-output examples. In another case, the user may instruct the data manipulation functionality 202 to read in a data file that contains the input-output examples. The data file can be obtained from any source, such as the other functionality 204, which may represent a local source and/or a remote source (with respect to the data manipulation functionality 202). Upon instruction, the data manipulation functionality 202 can use the program generation system 102 to provide a program 114. That program 114 expresses the logic embodied in the input-output examples. The program execution module 116 can then use the program 114 to automatically process new input items to generate new output items.

FIG. 2 shows the data manipulation functionality 202 and program generation system 102 as two distinct respective modules. In another case, the data manipulation functionality 202 may incorporate the program generation system 102 as one of its components, or vice versa. Likewise, FIG. 2 shows the program execution module 116 as a component within the data manipulation functionality 202. In another case, the data manipulation functionality 202 and the program execution module 116 may represent two distinct modules.

The data manipulation functionality 202 may invoke the program generation system in different modes. In one mode, the user may expressly invoke the functionality of the program generation system 102, e.g., by activating a command button, menu item, etc. within a user interface presentation provided by the data manipulation functionality 202. The user may then expressly identify a set of input-output examples for use in generating the program 114.

In another mode, the data manipulation functionality 202 can include detection functionality which detects that the user is repetitively performing the same type of transformation on a collection of input items to provide corresponding output items. The data manipulation functionality 202 can then automatically invoke the program generation system 102 based on the input-output examples that the user has already supplied.

These usage modes are representative rather than exhaustive. The data manipulation functionality 202 may interact with the program generation system 102 in yet other modes of operation.

The user may directly or indirectly invoke the program generation system 102 to accomplish different data manipulation objectives. In a first scenario, the user can invoke the program generation system 102 when there is some environment-specific desire to convert information expressed in a first format into information expressed in a second format. For example, in one case, the user may receive information from another person (or persons) in a first format. The user may wish to transform this information into a second format that is more acceptable to the user, based on any environment-specific consideration(s). In another case, the user herself may have created the information in the first format. The user may now wish to transform the information into the second format. In another case, the user may receive information from a source application, data store, or the like, expressed in the first format. The user may wish to convert this information into a second format that is more suitable for a target application, data store, or the like. For example, the user may wish to convert information from a format used by a document editing application to a format used by spreadsheet application, or vice versa. In another case, the user wish to convert information expressed in a markup language format (e.g., XML, HTML, etc.) to a non-markup language format, and so on. These examples are presented by way of illustration, not limitation.

In a second scenario, the user may directly or indirectly invoke the program generation system 102 for the primary purpose of extracting one or more data items from input items, obtained from any source. In this scenario, the second format represents a subset of information expressed in the first format.

In a third scenario, the user may directly or indirectly invoke the program generation system 102 based on a combination of reasons associated with the first scenario and the second scenario. For example, in addition to extracting information from the input items, the user may wish to perform any type of transformation on the extracted information. The user may also add information to the output items which has no counterpart in the input items.

The above-described data manipulation scenarios are representative rather than exhaustive. The user may invoke the program generation system 102 to accomplish yet other data manipulation objectives.

In terms of physical implementation, the various modules and systems shown in FIG. 2 can be implemented by one or more computing devices. These computing devices can be located at a single location or can be distributed over plural locations. For example, local data manipulation functionality 202 can interact with a local program generation system 102 to perform the functions summarized above. In another case, local data manipulation functionality 202 can interact with a remote network-implemented program generation system 102 to implement the functions described herein. Further, the various modules and systems shown in FIG. 2 can be administered by a single entity or plural entities.

Any type(s) of computing device(s) can be used to implement the functions described in FIG. 2, including a personal computing device, a workstation computing device, a laptop computing device, a personal digital assistant device, a mobile telephone device, a game console device, a set-top box device, a server computing device, and so on.

The program generation system 102 and the data manipulation functionality 202 can also interact with one or more data stores 206. For example, the data stores 206 can store input-output examples and the like.

With the above introduction, the explanation now advances to the illustrative composition of the program generation system 102. The program generation system 102 includes (or can be conceptualized to include) a collection of modules. This section provides an overview of these modules. Later respective sections provide additional details regarding each of these modules. By way of overview, the program generation system 102 can convert the input-output examples into the program 114 in a three-part process: a parsing module 208 performs the first part; a transformation module 210 performs the second part; and a formatting module 212 performs the third part.

More specifically, the parsing module 208 identifies respective parts of the input items. As noted above, these parts are referred to herein as input parts. The parsing module 208 can also identify respective parts of the output items. These parts are referred to herein as output parts. The parsing module 208 can use one or more parsing tools 216 to perform this function. The parsing tools 216 can rely on at least one data store 218 that provides parsing rules. Section B provides additional information regarding the operation of the parsing module 208.

The transformation module 210 determines whether each of the output parts identified by the parsing module 208 can be computed using one or more converter modules. The transformation module performs this task by searching within a data store 220. The data store 220 provides a collection of candidate conversion modules. Each candidate conversion module transforms input information into output information based on at least one predetermined rule. To facilitate this searching operation, the transformation module 210 may rely on one or more optional search tools 222. Section C provides additional information regarding the operation of the transformation module 210.

The formatting module 212 provides formatting instructions which transform selected output parts into a form specified by the original output items. For example, the formatting module 212 can arrange the output parts in an order that matches a format specified by the output items. Further, the formatting module 212 can print constant information to match invariant information presented in the output items. Section D provides additional information regarding the operation of the formatting module 212.

The program generation system 102 can output the generated program 114 which reflects the processing performed by the parsing module 208, the transformation module 210, and the formatting module 212. The generated program 114 can be used to transform new input items into new output items based on logic embodied in the collection of input-output examples. In one case, the program generation system 102 expresses the generated program 114 as a collection of program modules to be invoked in a particular order. One or more program modules may represent instantiations of converter modules identified by the transformation module 210. One or more other program modules may operate by extracting content in a new input item and printing that extracted content in a corresponding new output item. One or more other program modules may carry out formatting operations identified by the formatting module 212 that affect the appearance (but not necessarily the content) of the output parts, and so on.

Figure 3:
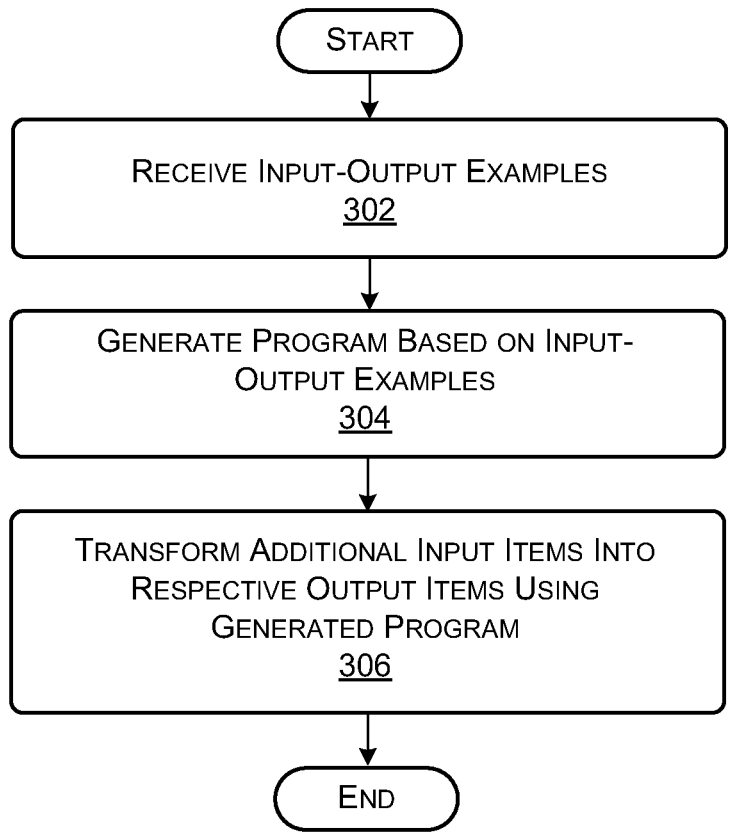
FIG. 3 is a flowchart that shows an overview of one manner of operation of the program generation system of FIG. 2.

FIG. 3 shows a procedure 300 which presents a high-level description of the operation of the data manipulation system 200 of FIG. 1. In block 302, the data manipulation system 200 receives a set of input-output examples. Each input-output example includes a data item (including one or more input string items) and an output item. In block 304, the data manipulation system 200 creates the program 114 based on the input-output examples. In block 304, the data manipulation system 200 uses the program 114 to transform additional new input items (which have not yet been transformed) into new output items.

Figure 4:
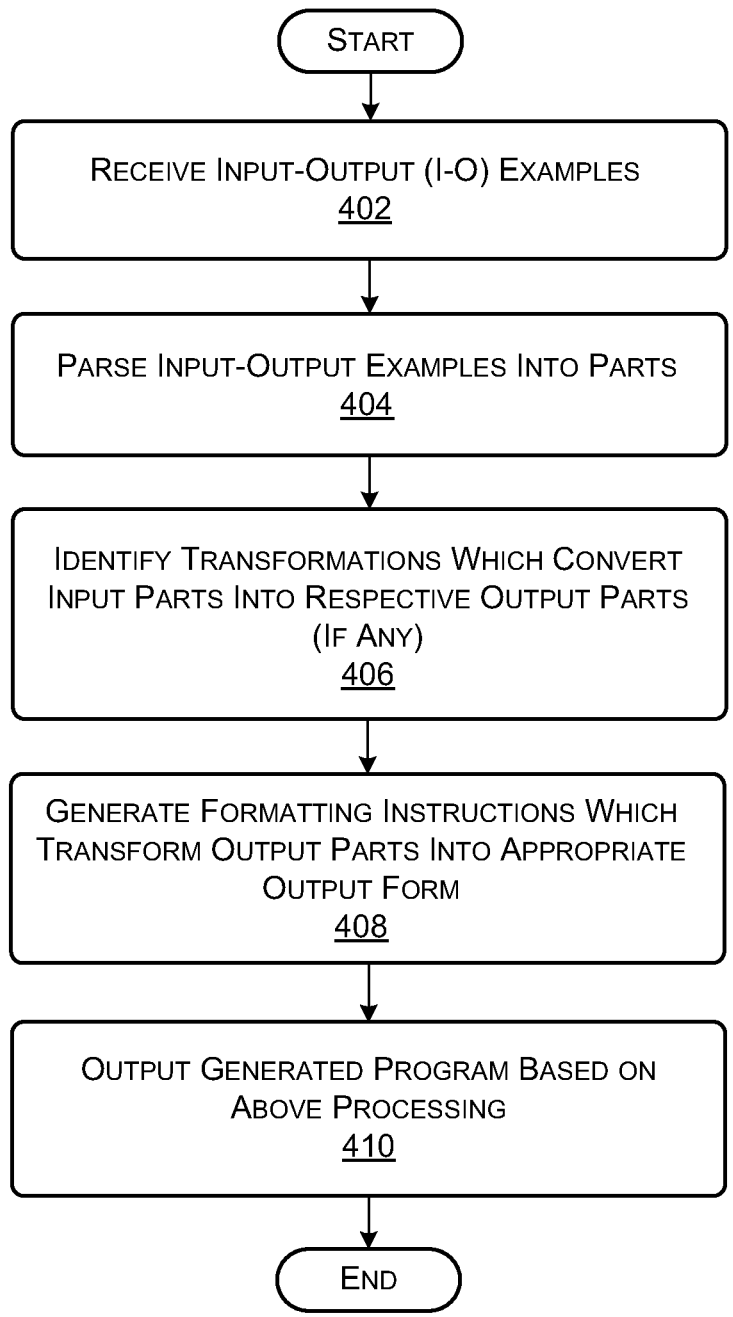
FIG. 4 is flowchart that shows how the program generation system (of FIG. 2) can generate a program using a three-part operation.

FIG. 4 shows a procedure 400 which presents a more detailed description of the manner in which the program generation system 102 produces the generated program 114. In block 402, the program generation system 102 receives a set of input-output examples. In block 404, the program generation system 102 parses each input item into component input parts, and parses each output item into component output parts. In block 406, the program generation system 102 identifies transformations (if any) which can convert input parts into respective output parts. These transformations are performed by respective converter modules selected from a collection of candidate converter modules. In block 408, the program generation system 102 generates formatting instructions which transform selected output parts into an appropriate form specified by the output items.

In block 410, the program generation system 102 outputs the generated program 114 on the basis of the analysis performed by blocks 404-408.

B. Illustrative Parsing Module

Figure 5:
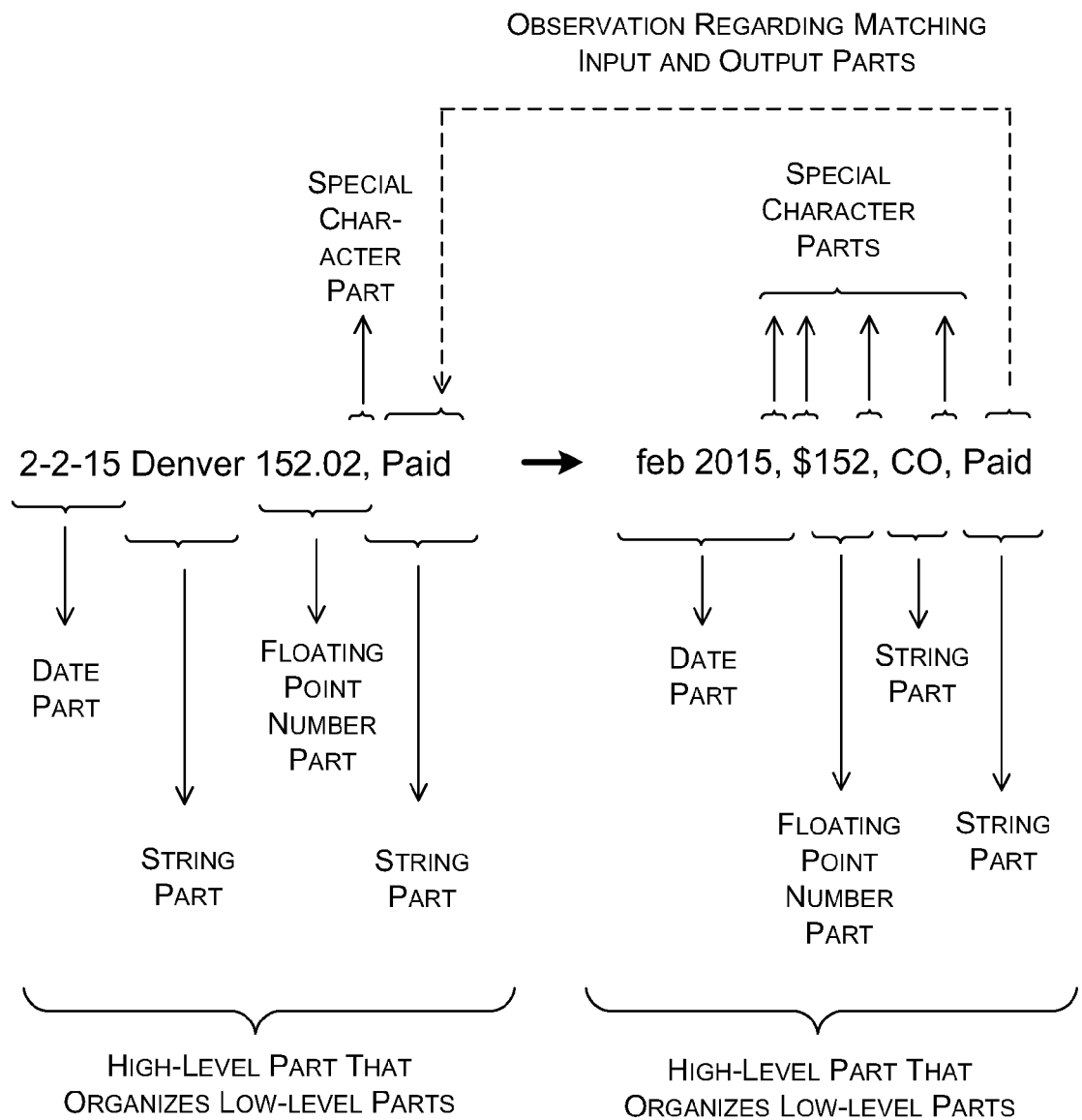
FIG. 5 shows an example which illustrates one manner of operation of a parsing module that is used in the program generation system of FIG. 2.
Figure 6:
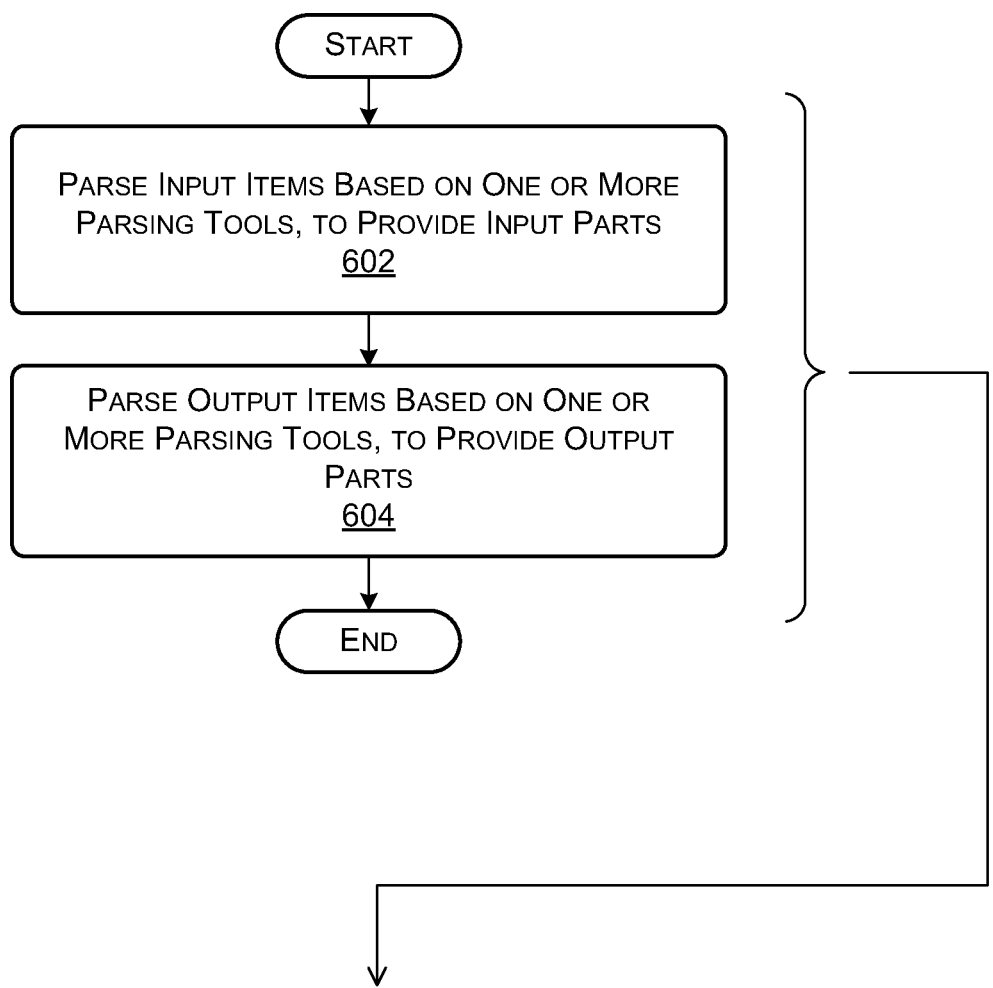
FIG. 6 is a flowchart which complements the example of FIG. 5, e.g., by showing an overview of one manner of operation of the parsing module.
Figure 7:
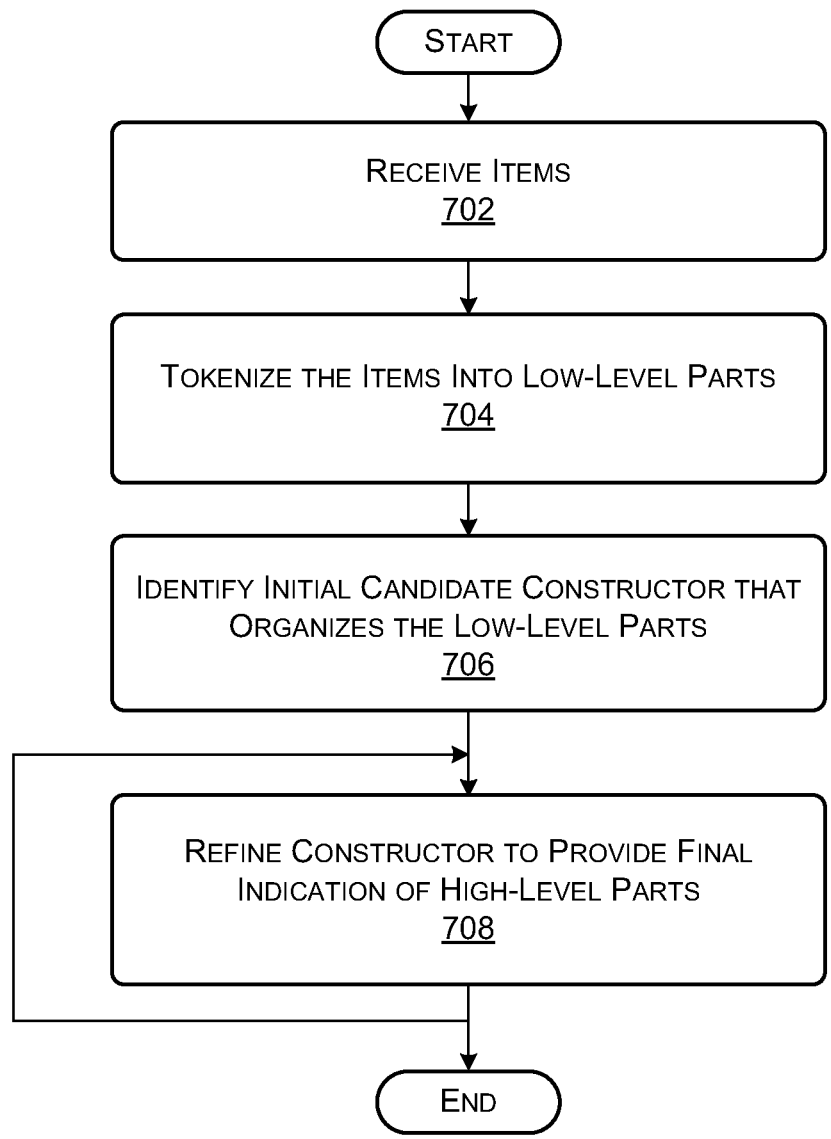
FIG. 7 is a flowchart that shows one way to implement parsing operations in the procedure of FIG. 6.

This section describes one manner of operation of the parsing module 208 of FIG. 2. To repeat, the parsing module 208 parses the input-output examples into component parts. FIG. 5 provides an example which sets forth one manner of operation of the parsing module 208. FIGS. 6 and 7 summarize concepts imparted by the example of FIG. 5 in generalized flowchart form.

More specifically, FIG. 5 shows the outcome of parsing performed on the first input-output example shown in FIG. 1. That input-output example includes an input item that reads as "2-2-15 Denver 152.02, Paid" and a corresponding output item that reads as "feb 2015, $152, CO, Paid." The parsing module 208 operates to break the input item into component parts (referred to herein as low-level input parts) and break the output item into component parts (referred to herein as low-level output parts). In the simplified representative example of FIG. 5, the parsing module 208 identifies the following low-level input parts: "2-2-15"; "Denver"; "152.02"; a comma; and "Paid." The parsing module 208 identifies the following low-level output parts: "feb 2015"; a comma; a dollar sign ("$"); "152"; a comma; "CO"; a comma; and "Paid."

In addition, or alternatively, the parsing module 208 can identify high-level parts. Each high-level part may combine two or more low-level parts described above. For example, the parsing module 208 can identify a high-level input part in the form of a constructor; that constructor organizes all of the individual input parts identified above in a prescribed manner (e.g., as a data structure). In addition, or alternatively, the parsing module 208 can break one or more of the above-identified low-level parts into yet smaller low-level parts. For example, the parsing module 208 can partition the input part "2-2-15" into a component month input part and a year input part.

In one case, the parsing module 208 can associate different data types with respective parts. Different data types can be defined for different respective environments. For example, in one merely representative environment, the parsing module 208 can identify data types corresponding to date-related information, integer-related information, floating-point-related information, string-related information, etc. Further, the parsing module 208 can assign different data types to corresponding "special" characters, such as punctuation marks of various kinds. Further, the parsing module 208 can assign data types to the above-described high-level parts. A high-level part is composed of two or more component data items associated with corresponding component data types.

In the simplified example of FIG. 5, the parsing module 208 provides a conclusive mapping of input items to input parts, and a conclusive mapping of output items to output parts. More generally, however, the parsing module 208 can identify two or more alternative interpretations as to how any item can be broken up into plural parts. The program generation system 102 can perform subsequent analysis to select an appropriate interpretation from among plural possible interpretations. Further, in the simplified example of FIG. 5, the parsing module 208 identifies non-overlapping input parts and non-overlapping output parts. More generally, however, the parsing module 208 can identify overlapping parts.

The parsing module 208 can perform the above-described parsing operation using one or more parsing tools 216. In a first implementation, the parsing module 208 parses an item (either an input item or an output item) into component parts using lexer functionality. The lexer functionality processes the item to identify patterns that match predetermined parsing rules specified in a data store. For example, a rule can define a word as a string that includes a sequence of characters without any intermediate whitespace characters. The lexer functionality can examine the item to determine whether the item contains any parts which match this description. More complex rules can be used for other data types, such as date information. The parsing module 208 can use the above-described type of lexer functionality to generate the low-level parts shown in FIG. 5.

In a second implementation, the parsing module 208 can provide additional parsing which organizes the low-level parts into high-level parts. Various known approaches can be used to perform this task. In one case, for instance, the parsing module 208 can use PADS-related technology, described, for instance in: Kathleen Fisher et al., "From Dirt to Shovels: Fully Automatic Tool Generation from Ad Hoc Data", *Proceedings of the 35th Annual ACM SIGPLAN-SIGACT Symposium on Principles of Programming Languages,* 2008, pp. 421-434; Kathleen Fisher, et al., "Learn-PADS: Automatic Tool Generation from Ad Hoc Data", *Proceedings of the ACM SIGMOD International Conference on Management of Data,* 2008, pp. 1299-1302; and Qian Xi, et al., "Ad Hoc Data and the Token Ambiguity Problem", *Proceedings of the 11th International Symposium on Practical Aspects of Declarative Languages,* 2009, pp. 91-106. Generally, the PADS technique automatically defines the organization of parts within data; the data is "ad hoc" in the sense that the PADS technique imposes no a-priori expectations regarding the organization of data parts within the data. FIG. 6, discussed below, provides additional information regarding the PADS technique.

In a third implementation, the parsing module 208 determines whether parts within the output items also appear as parts within the input items. For example, the parsing module 208 can determine that the string "Paid" that appears in the output item also appears, verbatim, within the input item. The parsing module 208 can use any technology for performing this comparison, such as the longest subsequence matching technique. The parsing module 208 can use this insight to help identify meaningful parts in both the input items and the output items. For example, the parsing module 208 can conclude that the word "Paid" is likely a meaningful unit of information because it appears in both the input item and the output item, even though the arrangement of parts in the output item is otherwise different than the arrangement of parts in the input item.

The parsing module 208 can use yet other types of tools and techniques to partition the items into parts. Further, the parsing module 208 can use a combination of two or more tools to perform the parsing. For example, one parsing tool can be used to help validate the accuracy of the parsing performed by another tool. In addition, or alternatively, one parsing tool can be used to identify additional parts which cannot be found using another tool, and so on.

FIG. 6 shows a procedure 600 which summarizes the operation of the parsing module 208 in flowchart form. In block 602, the parsing module 208 can use one or more parsing tools 214 to identify input parts within each input item. In block 602, the parsing module 208 can use one or more parsing tools 214 to identify output parts within each output item. In other implementations, the parsing module 208 can perform block 604 before block 602, or can perform blocks 602 and 604 at the same time.

Generally, after performing the procedure 500, the parsing module 208 outputs parsing information which enumerates possible parts within the input items and the output items. As mentioned above, the parsing information can capture alternative parsing interpretations. The transformation module 210 and the formatting module 212 perform analysis with respect to these identified parts. Ultimately, the program generation system 102 generates a program 114 based on one particular interpretation regarding the parsing of the input items and output items.

FIG. 7 shows a procedure 700 which provides information regarding the PADS tool in flowchart form, applied to the present context of processing items within input-output examples. In block 702, the PADS tool receives a plurality of items. In the present context, these items may correspond to a plurality of input items or a plurality of output items, or both input items and output items. In block 704, the PADS tool parses the items into respective low-level parts. For example, the PADS technique can use the above-described lexer functionality in combination with parsing rules to perform this task. This yields, for example, the type of low-level partitioning shown in the example of FIG. 5.

In blocks 706 and 708, the PADS technique performs additional parsing on the items to identify high-level parts. Namely, each high-level part can correspond to a constructor which defines the organization of two or more low-level parts identified in block 704.

More specifically, to begin with, in block 706, the PADS technique identifies a top-level encompassing part which describes the organization of low-level parts. In one approach, the PADS technique can perform this operation by determining the frequency of different low-level parts within the items, and then forming a histogram which expresses this frequency information. The PADS technique uses the histogram to propose a top-level constructor that can be used to organize the low-level parts. The PADS technique can use this same technique to identify the organization of individual sections within the top-level part.

In block 708, the PADS technique successively modifies the constructor identified in block 706 to improve its conciseness. For example, the PADS technique can generate a conciseness score which identifies the amount of information that is used to describe the partitioning of the items. The PADS technique can then modify the organization of the constructor based on various rules. The PADS technique then determines whether that modification impoves the conciseness score. If so, the PADS technique retains the modification and repeats the above modification operation. The PADS technique terminates the refinement step when it concludes that no further modification can improve the conciseness score.

The above-described PADS technique can be modified in various ways to potentially improve the quality of its results. For example, the PADS technique can generate a statistical model based on a corpus of training data. The PADS technique can then use that statistical model to define the most likely way of partitioning the items into low-level parts. The PADS technique can then infer the high-level parts in the manner described above.

To repeat, the parsing module 208 can use any parsing tool or tools, the known PADS technique being one of many possible tools. For example, in other implementations, the parsing module 208 can omit use of the PADS technique, e.g., by just using lexing functionality to identify low-level parts.

C. Illustrative Transformation Module

Figure 8:
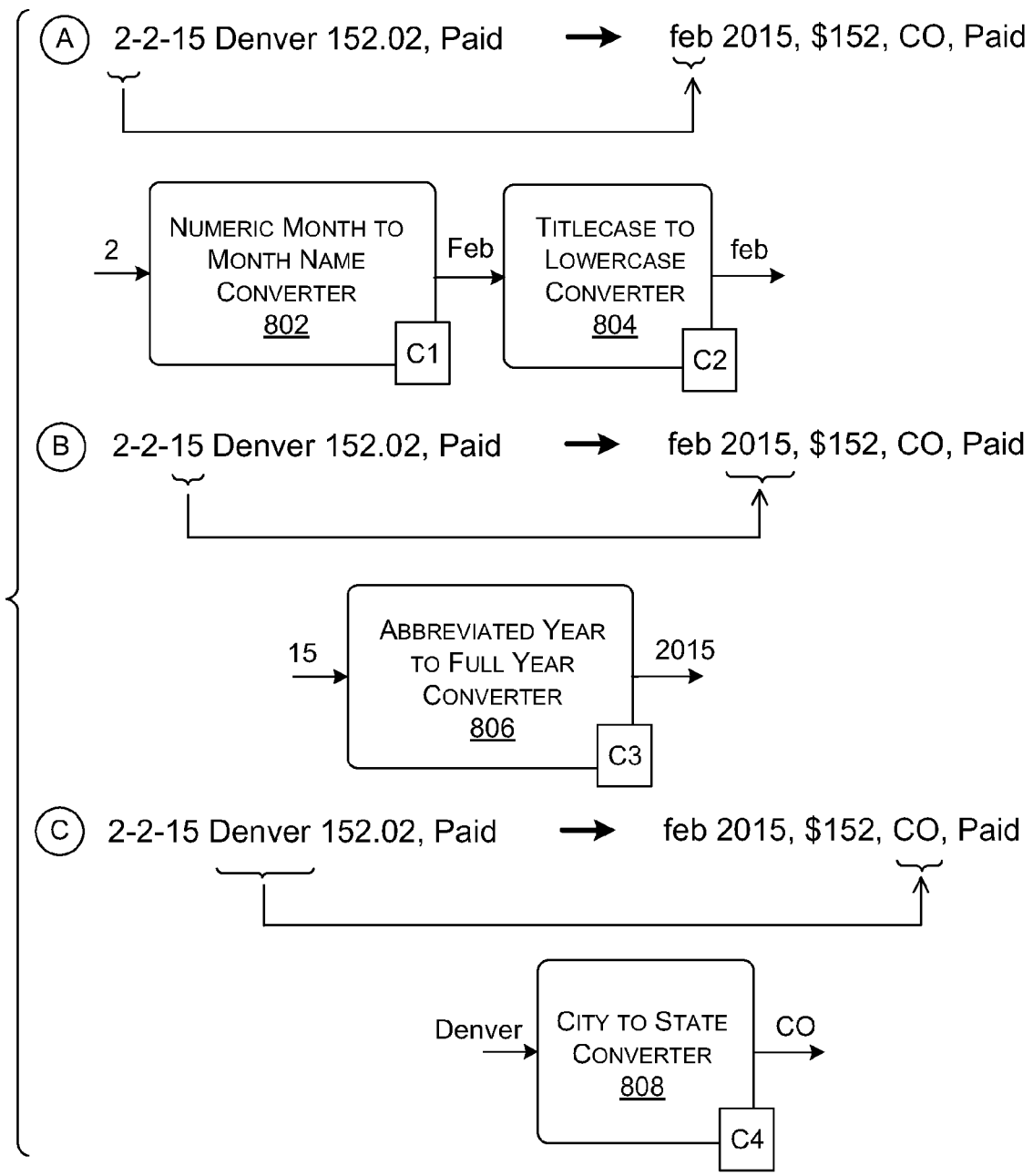
FIGS. 8 and 9 together show an example which illustrates one manner of operation of a transformation module that is used in the program generation system of FIG. 2.
Figure 9:
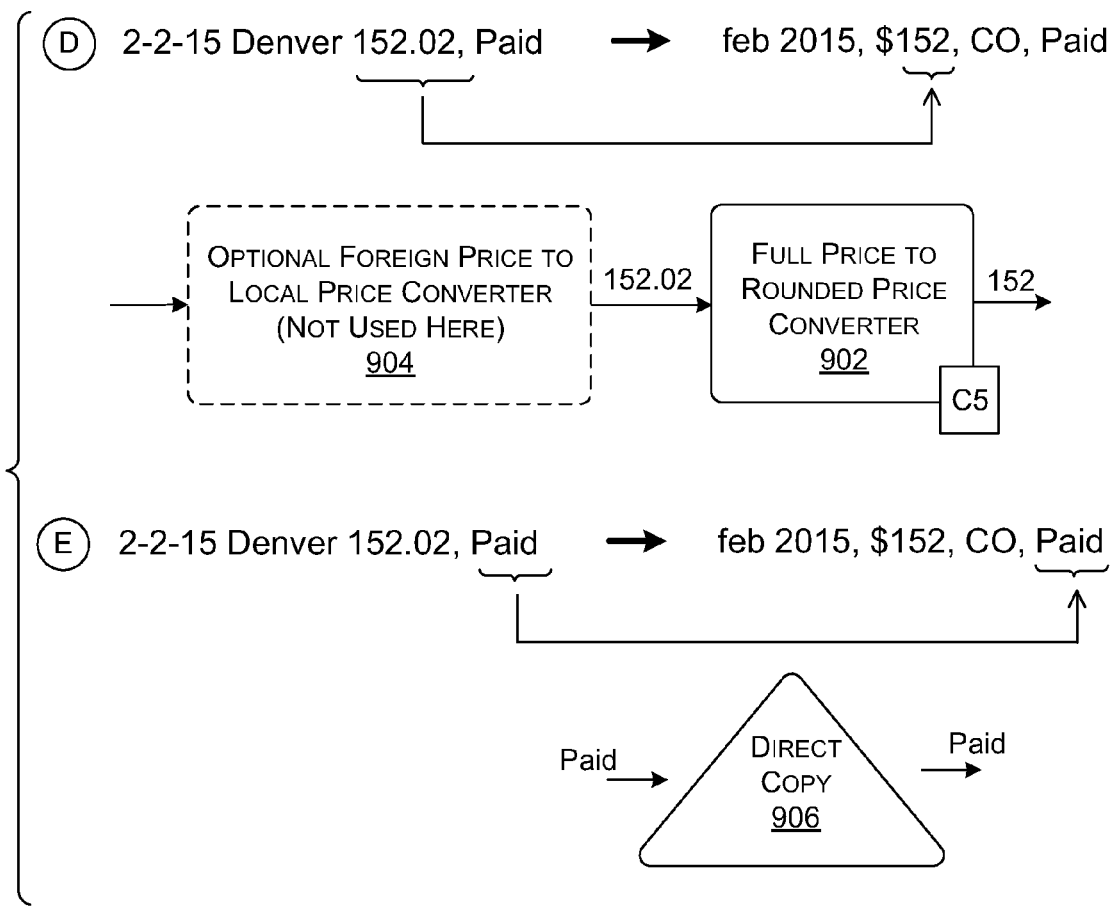
Figure 10:
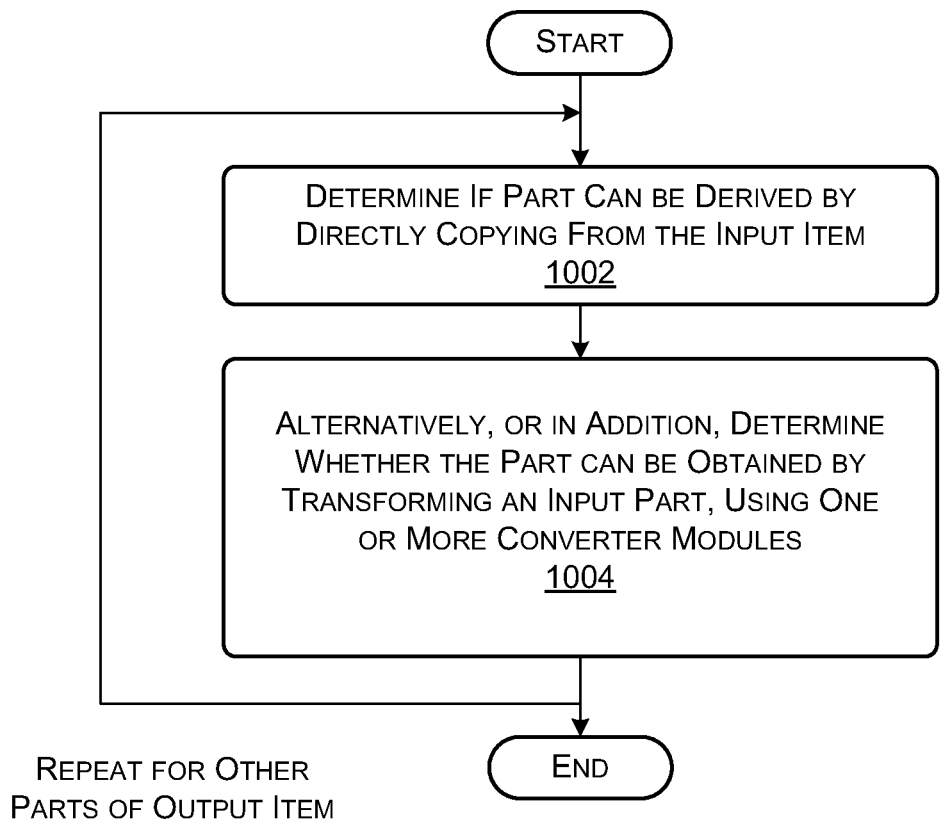
FIG. 10 is a flowchart which complements the example of FIGS. 8 and 9, e.g., by showing an overview of one manner of operation of the transformation module.

This section describes one manner of operation of the transformation module 210 of FIG. 2. To repeat, the transformation module 210 identifies one or more converter modules that can be used to transform input parts into corresponding output parts. FIGS. 8 and 9 show an example which sets forth one manner of operation of the transformation module 210. FIG. 10 summarizes concepts imparted by the example of FIGS. 8 and 9 in generalized flowchart form.

More specifically, FIGS. 8 and 9 show how different output parts correspond to different respective input parts. For each such case, the transformation module 210 investigates the collection of candidate converter modules (in data store 220) to determine whether there is one or more converter modules that can perform the transformation of the identified input part to the corresponding output part. In one case, the transformation module 210 identifies a single converter module that can perform the desired conversion. In other cases, the transformation module 210 identifies two or more converter modules that perform the desired conversion when applied in a specified sequence. In yet other cases, the transformation module 210 may not be able to find any converter module which performs the desired conversion.

Starting with the scenario labeled "A" the transformation module 210 identifies two converter modules (802, 804) that can generate "feb" in the output item based on the numeric month "2" in the input item. Namely, the converter module 802 receives a numeric month as an input and generates a three-letter month label as an output. The converter module 804 receives a titlecase sentence as an input and generates a lowercase sentence as an output.

In scenario B, the transformation module 210 identifies a single converter module 806 that can generate "2015" in the output item based on the number "15" in the input item. Namely, converter module 806 receives a two-digit year number as an input and generates a four-digit year number as an output.

In scenario C, the transformation module 210 identifies a single converter module 808 that can generate "CO" in the output item based on "Denver" in the input item. Namely, the converter module 808 receives a city name as an input and generates a corresponding state name as an output, where the state name corresponds to the state in which the city is located. The converter module 808 can use a predetermined lookup table to perform this type of conversion.

In scenario D, the transformation module 210 identifies a single converter module 902 for generating the number "152" in the output item based on the number "152.02" in the input item. Namely, the converter module 902 receives a floating point dollar amount as an input and generates a rounded-off dollar amount as an output. Although not used in this example, in other scenarios, the transformation module 210 can rely on a converter module 904 to convert monetary information from one currency basis to another, e.g., from British pounds to U.S. dollars, etc.

In scenario E, the transformation module 210 determines, based on the parsing information provided by the parsing module 208, that the word "Paid" in the output item exactly matches the same word in the input item. In this case, the transformation module 210 can forego an attempt to find a converter module to produce the output part "Paid." Instead, the program generation system 102 will generate a program module 906 which simply extracts the last word in the input item and repeats it as the last word in the output item.

As can be appreciated, the examples above are presented by way of illustration, not limitation. In general, at least one of the candidate converter modules in the collection can be configured to convert date information from a first date format to a second date format. At least one of the candidate converter modules in the collection can be configured to convert measurement information from a first standard to a second standard (such as by converting distance information from meters to feet, etc.). At least one candidate converter modules in the collection can be configured to convert numeric information into an output form using a mathematical operation (such as by performing a summation operation, a value-incrementing operation, a value-decrementing operation, and so on). At least one candidate converter module can search for identified content in an input item and replace it with designated content for use in a corresponding output item. The collection of converter modules can include yet other types of modules.

In one case, the program generation system 102 can use an extensible framework to implement the collection of candidate converter modules. Users can add new converter modules to the collection providing that these new converter modules conform to the format set forth by the extensible framework.

The transformation module 210 can use different approaches to identify appropriate converter modules. In one implementation, the transformation module 210 can successively apply different candidate converter modules to process the input items. After each computation using a particular converter module, the transformation module 210 can determine whether the output information generated by that converter module matches output parts within the output items in a consistent manner. For example, for scenario C, the transformation module 210 can successively feed the collection of city names to different candidate converter modules. The transformation module 210 can conclude that the city-to-state converter module 808 produces strings which consistently match the names of the states identified in the output items. Hence, the transformation module 210 can conclude that the converter module 808 is an appropriate choice to produce the state names in the output items. As stated above, in some cases, a transformation entails the use of two or more converter modules to convert an input part into a corresponding output part. Hence, the transformation module 210 can also methodically investigate different combinations of converter modules.

To accelerate the above-described search task, the transformation module 210 can rely on one or more search tools 222 (also referred to herein as search acceleration tools). For example, the transformation module 210 can use a satisfiability determination module, such as, but not limited to, a propositional satisfiability (SAT) tool or a Satisfiability Modulo Theories (SMT) tool. For example, the transformation module 210 can feed a logical formula to an SMT tool which expresses the existence of a composition of converter modules that can perform the desired transformation. The SMT tool can process the formula in the logical domain to determine whether it has at least one solution (and thereby can evaluate to TRUE); if so, the parameters associated with each solution correspond to one or more converter modules that can be used to perform the transformation. One particular SMT tool that can be used to perform this task is the publically-available Z3 SMT tool provided by Microsoft® Corporation of Redmond, Wash., e.g., as described in Leonardo de Moura, et al., "Z3: An Efficient SMT Solver", in *Tools and Algorithms for the Construction and Analysis of Systems*, Vol. 4963/2008, Apr. 3, 2008, pp. 337-340.

FIG. 10 shows a procedure 1000 which summarizes the above concepts in flowchart form. In block 1002, the transformation module 210 determines whether an output part under consideration can be derived by directly copying a corresponding input part from a corresponding input item. If so, the transformation module 210 can forego the investigation performed in block 1004. In block 1004, the transformation module 210 can determine whether the output part under consideration can be derived from a corresponding input part using one or more converter modules.

The loop in FIG. 10 indicates that the transformation module 210 can repeat the above analysis until it has identified a complete set of converter modules that may be used to generate output parts of the output items. In some cases, the transformation module 210 can conclude that one or more output parts cannot be derived using converter modules. Indeed, in some cases, the transformation module 210 can conclude that no output parts can be derived using converter modules.

In the above examples, it was assumed that all of the input items (associated with the input-output items) adopt a consistent format. In this case, a converter module (or combination of converter modules) is a viable choice if it provides a successful transformation for all instances of the input-output examples. In other implementations, the program generation system 102 can process input items that adopt two or more formats. For example, assume that the input items of FIG. 1 include two ways of describing the invoice information. In this case, the transformation module 210 can identify a first converter module (or combination of converter modules) which works for a first subset of input-output examples and a second converter module (or combination of converter modules) which works for a second subset of input-output examples. The generated program 114 can use conditional cues that appear in the input items to determine whether the first converter module or the second converter module is to be invoked.

D. Illustrative Formatting Module

Figure 11:
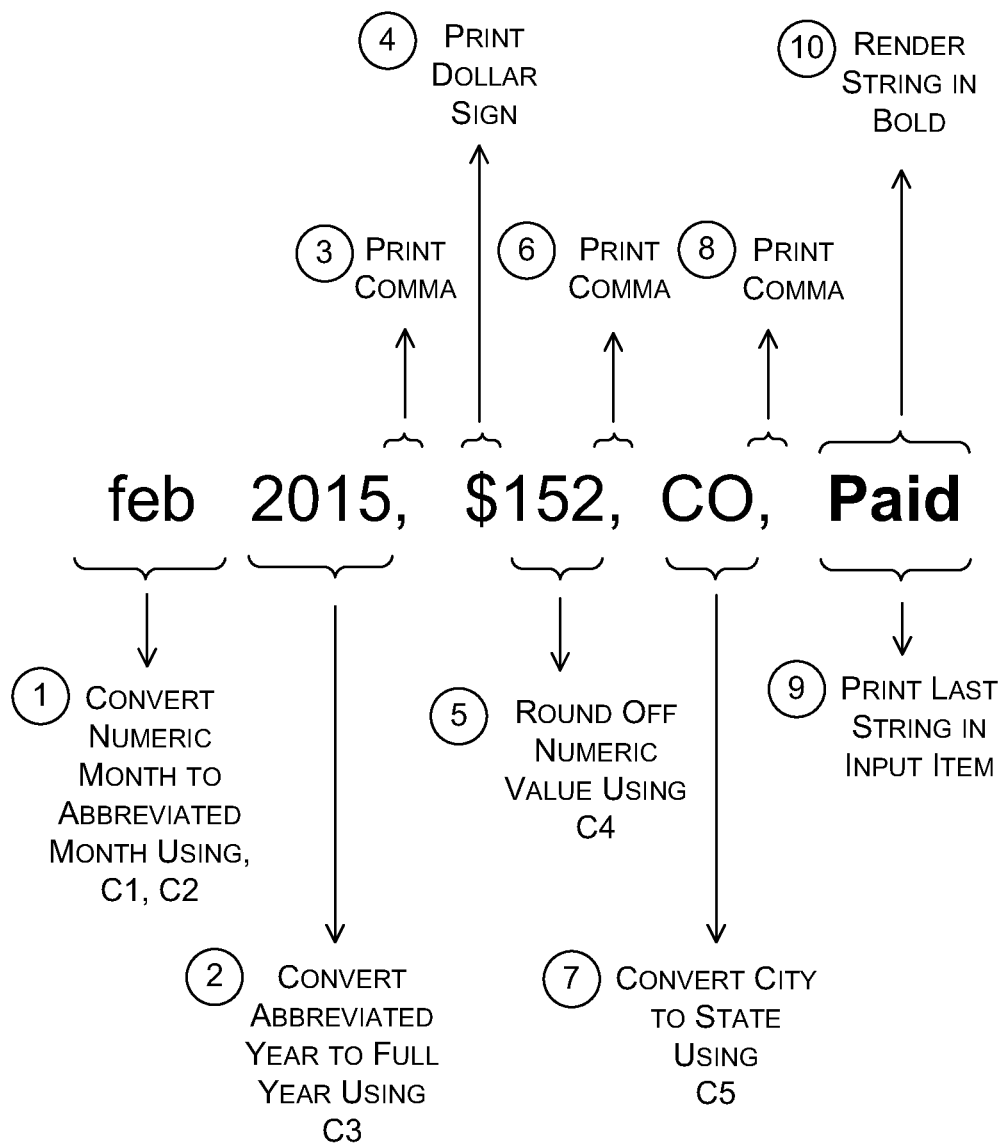
FIG. 11 shows an example which illustrates one manner of operation of a formatting module that is used in the program generation system of FIG. 2.
Figure 12:
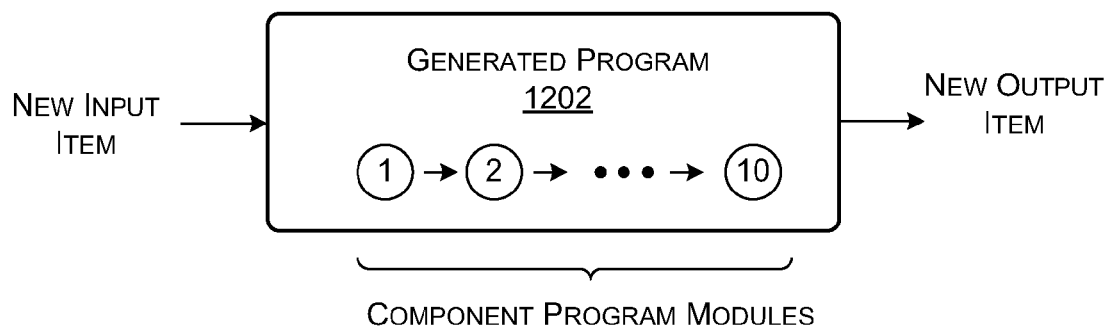
FIG. 12 shows an example of a program that can be generated by the program generation system of FIG. 2, based on the operation of the parsing module, the transformation module, and the formatting module.
Figure 13:
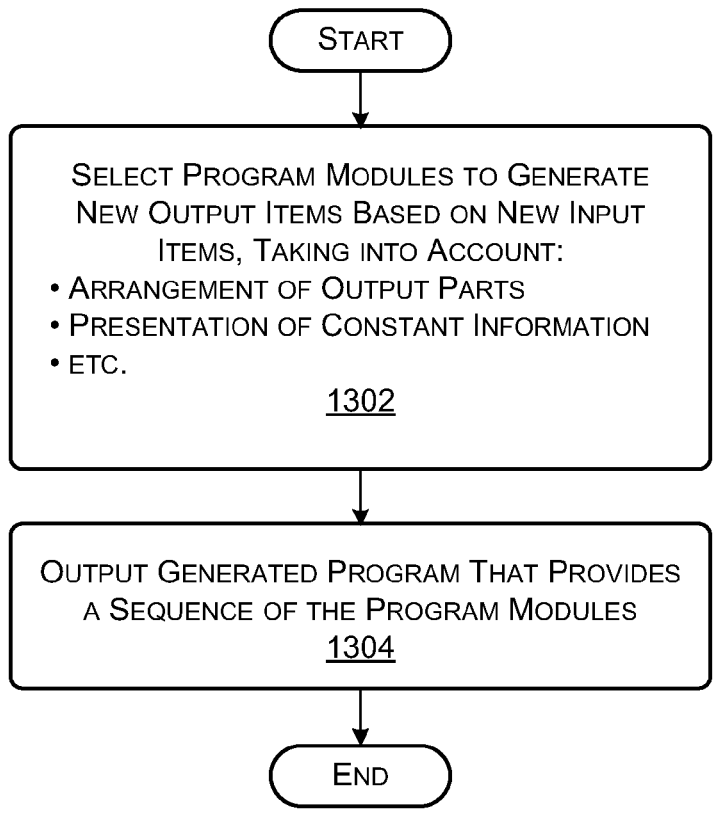
FIG. 13 is a flowchart which complements the example of FIG. 11, e.g., by showing one manner of operation of the formatting module of FIG. 2.

This section describes one manner of operation of the formatting module 212 of FIG. 2. To repeat, the formatting module 212 generates formatting instructions which present the output parts in a form specified by the original output items. FIGS. 11 and 12 show an example that sets forth one manner of operation of the formatting module 212. FIG. 13 summarizes concepts imparted by the example of FIGS. 11 and 12 in generalized flowchart form.

The formatting module 212 operates by selecting program modules which can be used to generate each part of the output items. First, the formatting module 212 can finalize the selection of conversion options identified by the parsing module 208 and the transformation module 210. For example, in some cases, the formatting module 212 can identify one or more program modules which provide one or more corresponding output parts using the converter module(s) identified by the transformation module 210. In addition, or alternatively, the formatting module 212 can identify one or more program modules which provide one or more corresponding output parts by directly copying portions of the input items; the parsing module 208 identifies this type of direct correspondence.

In addition, or alternatively, the formatting module 212 can identify one or more program modules which affect the manner in which the output items are visually presented in the output items. For example, the formatting module 212 can provide formatting instructions which print output parts in various columns (or other identified locations and/or orientations), various sizes, various colors, and so on. In addition, or alternatively, the formatting module 212 can provide formatting instructions which print constant information based on invariant information which appears in the original output items (where this invariant information is not accounted for by any converter modules). In addition, the formatting module 212 can identify formatting instructions which govern the order in which the generated program 114 will execute the program modules, which controls, in part, the order in which output parts will appear in the output items. To generate these kinds of formatting instructions, the formatting module 212 can establish a correspondence between output parts identified by the parsing module 208 and the transformation module 210 with content that appears in the original output items. This correspondence will identify how the output items can be presented to resemble the format of the original output items. For example, the formatting module 212 can identify that the words "Paid" and "Pending" appear in boldface in the original output items; therefore, the formatting module 212 can generate a formatting instruction which indicates that this part of each output item is to be presented in boldface.

More specifically, FIG. 11 shows formatting instructions that can be generated by the formatting module 212 for the first output item (of FIG. 1), which reads "feb 2015, $152, CO, Paid." For example, the formatting module 212 generates the following formatting instructions: (1) use the converter modules 802 and 804 to generate the output part "feb"; (2) use the converter module 806 to generate the output part "2015"; (3) use a comma-printing programming module to generate a comma; (4) use a dollar-sign-printing programming module to generate a dollar sign; (5) use the converter module 902 to generate the output part "152"; (6) use a comma-printing programming module to generate a comma; (7) use the converter module 808 to generate the output item "CO"; (8) use a comma-generating programming module to generate a comma; (9) use a direct-copy programming module to copy the last word in the input item (here, "Paid") and print it as the last word in the output item; and (10) use a highlight-generating module to render the last word ("Paid") in boldface.

The formatting module 212 also generates a formatting instruction which indicates that the generated program is to apply the above-indicated ten operations in succession (in the order given above) to produce the output item. For example, FIG. 12 shows a high-level view of a generated program 1202 which incorporates the ten operations described above. After being formed, the generated program 1202 can receive a new input item and generate a new output item. The new output item is produced by applying the ten operations in succession on the new input item.

In some cases, the formatting module 212 can identify two or more programming modules that can be used to generate the same output item, possibly predicated on different interpretations of how the output item is to be parsed. In that case, the transformation module 210 can apply any consideration to choose one of the programming modules (such as by selecting the least complex programming module). By making this selection, the formatting may, in some instance, implicitly select from among different parsing interpretations identified by the parsing module 208.

FIG. 13 shows a procedure 1300 which summarizes the explanation above in flowchart form. In block 1302, the formatting module 212 selects the programming modules that will be used to provide the generated program 114. As stated, the formatting module 212 can draw from different sources to provide the programming modules, including the converter modules identified by the transformation module 210. In block 1304, the formatting module 212 outputs the generated program 114 which includes the identified programming modules.

E. Representative Processing Functionality

FIG. 14 sets forth illustrative electrical data processing functionality 1400 that can be used to implement any aspect of the functions described above. With reference to FIGS. 1 and 2, for instance, the type of processing functionality 1400 shown in FIG. 14 can be used to implement any aspect of the program generation system 102, any aspect of the data manipulation functionality 202, etc. In one case, the processing functionality 1400 may correspond to any type of computing device (or plural such devices of any type), each of which includes one or more processing devices.

The processing functionality 1400 can include volatile and non-volatile memory, such as RAM 1402 and ROM 1404, as well as one or more processing devices 1406. The processing functionality 1400 also optionally includes various media devices 1408, such as a hard disk module, an optical disk module, and so forth. The processing functionality 1400 can perform various operations identified above when the processing device(s) 1406 executes instructions that are maintained by memory (e.g., RAM 1402, ROM 1404, and/or elsewhere). More generally, instructions and other information can be stored on any computer readable medium 1410, including, but not limited to, static memory storage devices, magnetic storage devices, optical storage devices, and so on. The term computer readable medium also encompasses plural storage devices.

The processing functionality 1400 also includes an input/output module 1412 for receiving various inputs from a user (via input modules 1414), and for providing various outputs to the user (via output modules). One particular output mechanism may include a display device 1416 and an associated graphical user interface (GUI) 1418. The processing functionality 1400 can also include one or more network interfaces 1420 for exchanging data with other devices via one or more communication conduits 1422. One or more communication buses 1424 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed using at least one computing device, for generating a program that performs a data manipulation task, comprising:
 receiving input-output examples that include input items and corresponding output items, the corresponding output items representing transformed versions of respective input items;
 parsing the input items and the output items to provide a plurality of input parts and output parts, respectively, the parsing including:
  identifying multiple alternative approaches for parsing the input items and the output items into the plurality of input parts and output parts; and
  selecting, based on analysis of the multiple alternative approaches, one of the multiple alternative approaches to use to parse the input items and the output items;
 identifying portions of the output items that match portions of the respective input items by comparing the input parts with the output parts;

determining, for each output part, whether the output part can be produced from a corresponding input part using one or more converter modules;

generating formatting instructions which transform selected output parts into a form specified by the output items; and automatically creating a program based on said parsing, said determining, and said generating, the program being configured to be used to transform subsequently received new input items into new respective output items.

2. The method of claim 1, wherein said parsing comprises determining the input parts and the output parts based on a data store of parsing rules.

3. The method of claim 1, wherein said determining comprises selecting said one or more converter modules from a collection of candidate converter modules.

4. The method of claim 3, wherein said determining comprises investigating each candidate converter module in the collection of candidate converter modules.

5. The method of claim 4, wherein said determining also comprises investigating each combination of two or more converter modules in the collection of candidate converter modules.

6. The method of claim 3, wherein said determining comprises using a search acceleration tool to select said one or more converter modules from the collection of candidate converter modules.

7. The method of claim 6, wherein the search acceleration tool is a satisfiability determination module.

8. The method of claim 3, wherein at least one of the candidate converter modules converts date information from a first date format to a second date format.

9. The method of claim 3, wherein at least one of the candidate converter modules converts measurement information from a first standard to a second standard.

10. The method of claim 3, wherein at least one of the candidate converter modules processes numeric information using a mathematical operation.

11. The method of claim 1, wherein said generating comprises generating formatting instructions which arrange output parts in an order which matches a format specified by the output items.

12. The method of claim 1, wherein said generating comprises generating formatting instructions which print constant information to match invariant information presented in the output items.

13. A program generation system comprising:
a data store that provides a collection of candidate converter modules, each candidate converter module configured to transform input information into output information based on at least one predetermined conversion rule;
at least a memory and a processor to implement:
a parsing module configured to receive a plurality of input-output examples, the input-output examples including input items and corresponding output items that represent transformed versions of respective input items, and to process the input items and the output items based on at least:
identification of two or more alternative approaches for dividing the input items and the output items into plural parts;
selection of one said approach based on an analysis of the two or more alternative approaches;
provision of a plurality of input parts and output parts, respectively, based on the selected approach; and
identification of portions of the output items that match portions of the input items based on a comparison of the input parts with the output parts;
a transformation module configured to determine, for each output part, whether the output part can be produced from a corresponding input part using one or more converter modules selected from the collection of candidate converter modules; and
a formatting module configured to generate formatting instructions that transform selected output parts into a form specified by the output items,
the program generation system configured to automatically create a program using the parsing module, the transformation module, and the formatting module to be used to transform subsequently received new input items into new respective output items.

14. The program generation system of claim 13, wherein the parsing module is configured to determine the input parts and the output parts based on a data store of parsing rules.

15. The program generation system of claim 13, wherein the transformation module is configured to use a search acceleration tool to select said one or more converter modules from the collection of candidate converter modules.

16. The program generation system of claim 13, wherein the formatting module is configured to generate formatting instructions which arrange output parts in an order which matches a format specified by the output items.

17. The program generation system of claim 13, wherein the formatting module is configured to generate formatting instructions which print constant information to match invariant information presented in the output items.

18. A computer readable storage device for storing computer readable instructions, the computer readable instructions providing a program generation system when executed by one or more processing devices, the computer readable instructions comprising:
parsing logic configured to receive input-output examples, the input-output examples providing input items and corresponding output items that represent transformed versions of the input items, the parsing logic configured to:
process the input items to provide a plurality of input parts based on identification of multiple alternative approaches for dividing the input items into the plurality of input parts, and selection of one said approach based on an analysis of the multiple alternative approaches;
process the output items to provide a plurality of output parts based on selection of an additional approach from among multiple additional alternative approaches for dividing the output items into the plurality of output parts; and
identify portions of the output items that match portions of respective input items by comparing the output parts with the input parts;
transformation logic configured to determine, for each output part, whether the output part can be produced from a corresponding input part using one or more converter modules selected from a collection of candidate converter modules, each candidate converter module configured to transform input information into output information based on at least one predetermined conversion rule;

formatting logic configured to generate formatting instructions which transform selected output parts into a form specified by the output items, at least one formatting instruction governing an order of presentation of the output parts; and program generation logic configured to use at least the selected one or more converter modules and the generated formatting instructions to produce a program that is to be used to transform subsequently received additional input items into additional respective output items.

19. The computer readable storage device of claim 18, wherein the transformation logic is configured to use a search acceleration tool to select said one or more converter modules from the collection of candidate converter modules.

20. The computer readable storage device of claim 18, wherein the formatting logic is configured to generate formatting instructions which print constant information to match invariant information presented in the output items.

* * * * *